United States Patent
Sihler et al.

(10) Patent No.: US 11,739,629 B2
(45) Date of Patent: *Aug. 29, 2023

(54) STRAIN GAUGES FOR DETECTING DEFORMATIONS OF A PLATE

(71) Applicant: Schlumberger Technology Corporation, Sugar Land, TX (US)

(72) Inventors: Joachim Sihler, Cambridge (GB); Jonathan Robert Hird, Cambridge (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 346 days.

This patent is subject to a terminal disclaimer.

(21) Appl. No.: 16/942,807

(22) Filed: Jul. 30, 2020

(65) Prior Publication Data

US 2021/0033477 A1 Feb. 4, 2021

Related U.S. Application Data

(60) Provisional application No. 62/880,997, filed on Jul. 31, 2019.

(51) Int. Cl.
*E21B 47/007* (2012.01)
*G01L 1/26* (2006.01)
*G01L 5/00* (2006.01)

(52) U.S. Cl.
CPC .............. *E21B 47/007* (2020.05); *G01L 1/26* (2013.01); *G01L 5/0061* (2013.01)

(58) Field of Classification Search
CPC ...... E21B 47/01; E21B 47/007; E21B 47/017; E21B 17/16; G01L 5/0061; G01L 1/26
See application file for complete search history.

(56) References Cited

U.S. PATENT DOCUMENTS

| | | |
|---|---|---|
| 3,968,473 A | 7/1976 | Patton et al. |
| 4,608,861 A | 9/1986 | Wachtler et al. |
| 4,811,597 A | 3/1989 | Hebel |
| 5,386,724 A | 2/1995 | Das et al. |
| 6,068,394 A | 5/2000 | Dublin, Jr. |

(Continued)

FOREIGN PATENT DOCUMENTS

| | | | |
|---|---|---|---|
| CN | 113653482 A | * | 11/2021 |
| GB | 2272107 A | | 5/1994 |

OTHER PUBLICATIONS

Office Action in U.S. Appl. No. 16/942,820, dated Oct. 4, 2022, 10 pages.

*Primary Examiner* — Frederick L Lagman
(74) *Attorney, Agent, or Firm* — Jeffrey D. Frantz

(57) ABSTRACT

A bottom hole assembly (BHA) of a drill string includes a chassis, a plate coupled to the chassis, and a strain gauge coupled to the plate. The strain gauge is used to output a signal associated with a deformation of the plate. The plate and chassis may be included within a collar that experiences strain, and deformation of the collar may be translated to the chassis and the plate. The plate may experience strain in the form of torsional bending, in-plane bending, out-of-plane bending, axial tension or compression. The plate may include or be coupled to an electronics board that has strain gauges to measure different types of strain in isolation from other types of strain.

20 Claims, 18 Drawing Sheets

(56) References Cited

U.S. PATENT DOCUMENTS

| | | | |
|---|---|---|---|
| 6,216,533 B1* | 4/2001 | Woloson | E21B 47/06 |
| | | | 73/152.01 |
| 6,684,949 B1* | 2/2004 | Gabler | G01G 19/18 |
| | | | 166/250.01 |
| 9,372,124 B2 | 6/2016 | Schlosser | |
| 9,663,996 B2 | 5/2017 | Yao | |
| 9,927,310 B2 | 3/2018 | Bryant et al. | |
| 9,932,816 B2 | 4/2018 | Sobolewski et al. | |
| 11,066,922 B2 | 7/2021 | Moriarty | |
| 11,408,783 B2* | 8/2022 | Simeonov | G01L 1/2287 |
| 2004/0007357 A1 | 2/2004 | Gabler et al. | |
| 2005/0150689 A1 | 7/2005 | Jogi et al. | |
| 2008/0202810 A1 | 8/2008 | Gomez | |
| 2009/0071645 A1 | 3/2009 | Kenison et al. | |
| 2011/0083845 A1* | 4/2011 | McLaughlin | E21B 37/08 |
| | | | 166/254.2 |
| 2014/0096620 A1 | 4/2014 | Perrin et al. | |
| 2014/0265565 A1* | 9/2014 | Cooley | H02J 7/007184 |
| | | | 320/167 |
| 2015/0107824 A1* | 4/2015 | Signorelli | H02J 7/0016 |
| | | | 166/244.1 |
| 2015/0218934 A1* | 8/2015 | Turner | E21B 47/02 |
| | | | 175/45 |
| 2017/0248004 A1* | 8/2017 | Garner | E21B 47/12 |
| 2019/0025458 A1* | 1/2019 | Wille | G01V 11/002 |
| 2019/0145244 A1 | 5/2019 | Moriarty | |
| 2021/0032974 A1* | 2/2021 | Sihler | E21B 47/01 |
| 2021/0404319 A1* | 12/2021 | Simeonov | G01L 1/2206 |

* cited by examiner

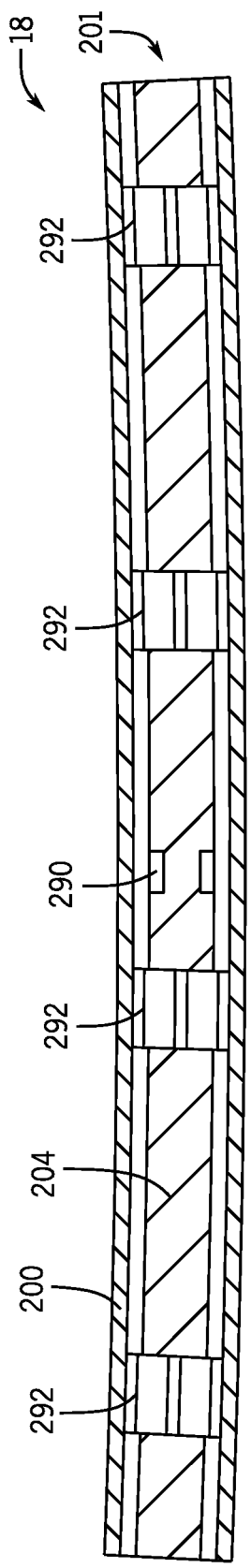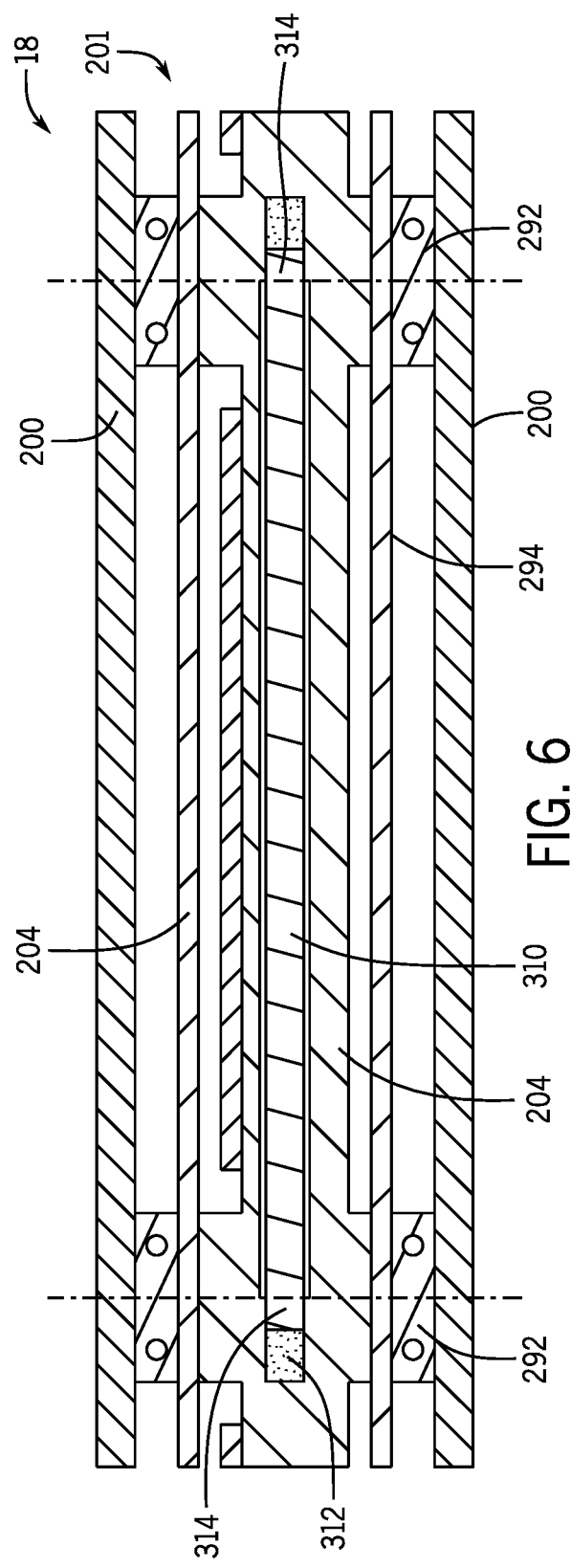
FIG. 5
FIG. 6

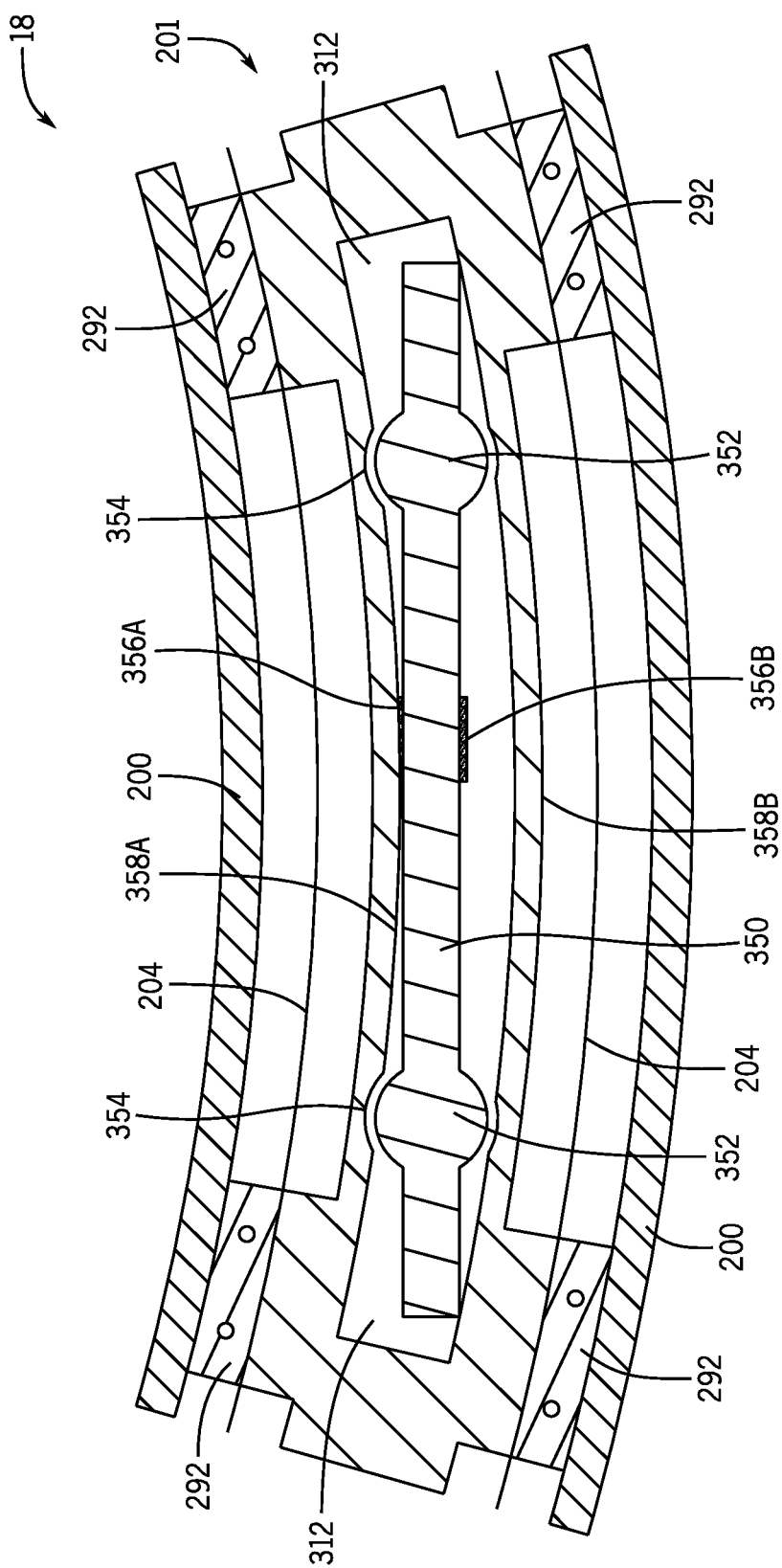

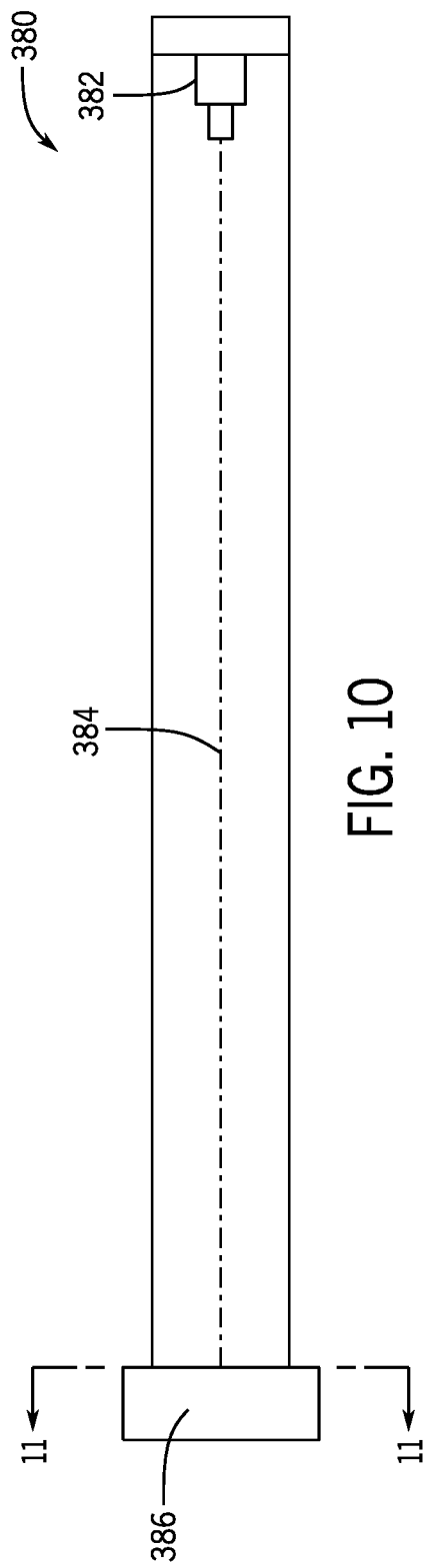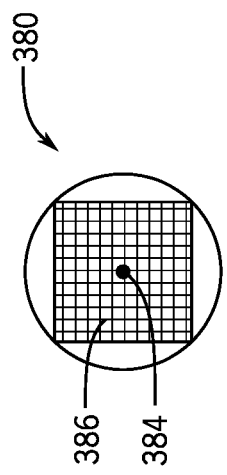

STRAIN GAUGES FOR DETECTING DEFORMATIONS OF A PLATE

CROSS-REFERENCE TO RELATED APPLICATIONS

This application claims the benefit of, and priority to U.S. Patent Application No. 62/880,997, filed Jul. 31, 2019 and titled "Strain Gauges for Detecting Deformations of a Plate", and is related to U.S. Patent Application No. 62/880,918, filed Jul. 31, 2019 and titled "Indirect Detection of Bending of a Collar." Each of the foregoing is expressly incorporated herein by this reference.

BACKGROUND

Oil and gas industry processes include exploration, drilling, logging, extraction, transportation, refinement, retail, and so forth, of natural resources, such as oil, gas, and water. The natural resources may be located underground and, as such, a drilling system may be used to perform some of the processes. For example, a drilling system may form wellbores into the earth formation to discover, observe, analyze, or extract the natural resources.

When drilling, forces acting upon the drilling system may negatively impact the performance of the drilling system. For example, such forces may take energy input into the drilling system and create vibration or heat (e.g., through friction). When vibration and heat are generated, some of the input energy is lost and the system operates at a reduced efficiency. Wellbores may also be planned to extend in a particular direction, and forces acting on the drilling system may affect trajectory of a drill bit, thereby causing the drill bit to drill a wellbore that deviates from the planned trajectory or path.

SUMMARY

During operation of a drilling system to form a wellbore, certain forces may affect components of the drilling system to cause deformations of the components. Thus, determining the deformation of the components may facilitate determining the forces imparted onto the components. It may be difficult to use conventional techniques to directly determine the deformation of certain components (e.g., by using sensors attached to the certain components), such as a drill collar, of the drilling system due to cost, complexity, or inherent disadvantages of implementing the conventional techniques (e.g., creating channels in the drill collar). Thus, the presently disclosed systems and methods may indirectly determine the deformation of such components by determining the deformation of alternative components, and then using the determined deformation of alternative components to determine the forces imparted onto the drilling system and/or to set an operation of the drilling system. In some embodiments, the determined forces may then be used to estimate a position or trajectory of the drilling system to facilitate, for example, steering of the drilling system.

Various refinements of the features noted herein may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary herein is intended only to familiarize the reader with certain aspects and contexts of embodiments of the present disclosure without limitation to the claimed subject matter.

In some embodiments, a drilling system includes an internal assembly and a drill collar coupled to and enclosing the internal assembly. The internal assembly has a chassis and a strain gauge coupled to the chassis, and the strain gauge can output a signal associated with a deformation of the internal assembly. The coupling of the internal assembly and drill collar are such that deformation of the drill collar causes the deformation of the internal assembly.

In some embodiments, a drilling component includes a chassis having a compartment, a rod within the compartment, and a sensor coupled to the rod. The sensor can determine a parameter associated with a deformation of the rod.

In some embodiments, a bottom hole assembly (BHA) of a drill string includes a chassis, a controller at least partially within the chassis, a drill collar coupled to and enclosing at least a portion of the chassis, and a sensor coupled to the chassis and communicatively coupled to the controller. The sensor may transmit a signal indicative of a bending strain of the chassis to the controller.

In some embodiments, a BHA of a drill string includes a chassis, a plate coupled to the chassis, and a strain gauge coupled to the plate. The strain gauge is configured to output a signal associated with a deformation of the plate.

In some embodiments, a BHA of a drill string includes an electronics board configured to operate the BHA and a strain gauge coupled to the electronics board. The strain gauge transmits a signal indicative of a deformation to the electronics board to control operation of the BHA based at least partially on the signal indicative of the deformation to the electronics board.

In some embodiments, a plate within a bottom hole assembly includes a first surface, a second surface opposite the first surface, and a torsion strain gauge coupled to the first surface or the second surface. Two in-plane bending strain gauges are also each coupled to the first surface or each coupled to the second surface, and are on opposite sides of a centerline of the plate and while being aligned along a lateral axis of the plate. A first out-of-plane bending strain gauge is coupled to the first surface of the plate along the centerline of the plate and a second out-of-plane bending strain gauge is coupled to the second surface of the plate along the centerline and aligned with the first out-of-plane bending strain gauge along a vertical axis of the plate. First and second axial strain gauges are also coupled to the first and second surfaces of the plate, respectively, along the centerline of the plate and aligned with each other along the vertical axis.

In some embodiments, an electronics board within a bottom hole assembly, includes a board. Coupled to the board are at least one torsion strain gauge, at least one in-plane strain gauge, at least one out-of-plane strain gauge, and at least one axial strain gauge. The torsion strain gauge measures torsion deformation of the board and is isolated from measuring in-plane bending, out-of-plane bending, and axial deformation of the board. The in-plane strain gauge measures in-plane bending deformation of the board and is isolated from measuring torsion, out-of-plane bending, and axial deformation of the board. The out-of-plane strain gauge measures out-of-plane bending deformation of the board and is isolated from measuring torsion, in-plane bending, and axial deformation of the board. The axial strain gauge measures axial deformation of the board and is isolated from measuring torsion, in-plane bending, and out-of-plane bending deformation of the board.

The above summary recites aspects of some embodiments disclosed herein, and presents aspects merely to provide the reader with a brief summary of certain embodiments. This summary is not intended to provide a comprehensive recitation of features of each embodiment, and is not intended to limit the scope of this disclosure. Indeed, this disclosure may encompass a variety of aspects that may not be set forth in the summary, but which are described or illustrated in the description, drawings, or claims.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings are drawn to scale. The drawings that are drawn to scale are illustrative only, and while being to scale for some embodiments, are not to scale for other embodiments. Understanding that the drawings depict some example embodiments and that various aspects of the disclosure will be better understood upon reading the following description and upon reference to the drawings, the embodiments will be described and explained with additional specificity and detail through the use of the accompanying drawings in which:

FIG. 5 is a schematic section view of a BHA having a strain gauge attached to an internal assembly of the BHA, according to an embodiment of the disclosure;

FIG. 6 is a schematic section view of a BHA having a chassis within a drill collar, according to an embodiment of the disclosure;

FIG. 9 is a schematic section view of the BHA of FIG. 8, while the BHA is bending, according to an embodiment of the disclosure;

FIG. 10 is a schematic view of a rod that may be in a chassis compartment, and which may be used to in determining BHA bending, according to an embodiment of the disclosure;

FIG. 11 is a section view of the rod of FIG. 10 taken along lines 11-11, according to an embodiment of the disclosure;

DETAILED DESCRIPTION

Figure 1:
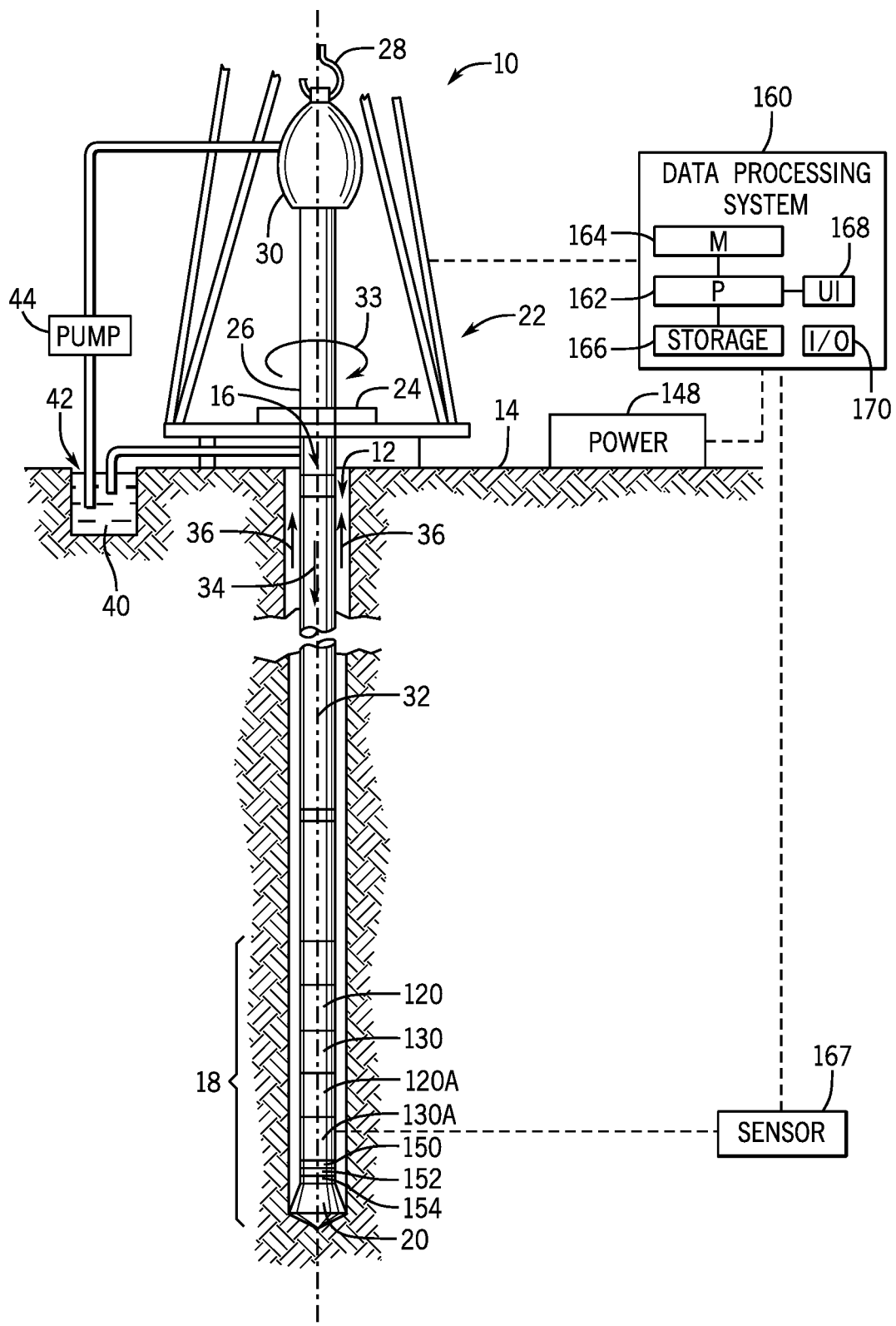
FIG. 1 is a schematic diagram of an embodiment of a drilling system having a drill string, according to an embodiment of the disclosure.

Embodiments of the present disclosure relate generally to determining deformations, and more particularly to determining deformations within a downhole drilling system. More particularly still, internal assemblies or components of a downhole drilling system may include strain gauges or other sensors for determining the strain or other deformation experienced by a component of the downhole drilling system. Optionally, deformation measurements are made using sensors that are isolated from other modes of bending, deformation, or strain.

In an illustrative aspect, embodiments of the present disclosure are directed to strain determinations within a drilling system that uses a drill string to form a wellbore extending to or toward a hydrocarbon field. The drilling system may rotate a full or partial length of the drill string and drive a drill bit that cuts away into the geological formation in which hydrocarbons are located. During operation, the drilling system may determine or infer a position, path, or movement of the drill string, to regulate operation of the drilling system. As an example, the drilling system may drive the drill string—including the drill bit—toward a target location in the geological formations, while monitoring and controlling the movement of the drill string to ensure that the drill string is moving as desired through the geological formations.

During operation of the drilling system, forces may act on the drill string and impact a performance of the drilling system or affect a structural integrity of a component of the drill string. Example forces include weight imparted by gravity, fluid pressure exerted by drilling fluid, friction from engagement between the drill string and the geological formation, torque on the drill string (or a portion thereof) generated by a surface system or downhole motor, intermolecular forces occurring as a result of increased temperature on account of friction or downhole conditions, and the like. In some circumstances, the forces may negatively affect operation of the drilling system, such as by moving the drill string away from the target position, by reducing efficiency by creating vibration or heat, or the like.

The forces on the drill string may also structurally change components of the drill string. Thus, identifying the structural changes to the drill collar may allow inference or other determination of the imparted forces, and may be used to establish or control the drilling system operation to avoid or limit undesired results of forces imparted onto the drill collar. Embodiments of the present disclosure primarily discus the determination of structural changes associated with a deformation, including torsional strain, out-of-plane bending strain, in-plane bending strain, axial strain, and combinations thereof; however, other types of deformations (e.g., shear strain) may be determined in additional or alternative embodiments.

Within a downhole system, it may be difficult to directly determine the deformations of a drill collar or other component (e.g., by using sensors on the drill collar). For instance, certain types of deformations may affect the readings of other types of deformations (e.g., torsional strain affects an out-of-plane strain reading, etc.). In another example, it may be difficult, inefficient, or both difficult and inefficient to couple the sensor directly to the drill collar or other component in a manner that enables the sensor to determine the structural changes of the component while the drill string is in operation. For example, the sensor may instead be coupled directly onto a drill collar in a controlled environment (e.g., a temperature-controlled laboratory) and by trained personnel to enable the sensor to provide accurate readings. As such, implementing the sensor may increase a cost associated with manufacturing the drill string or may operate only in a narrow range of applications that may not include a harsh downhole environment. Moreover, the sensor may have to be wired to electrical components within the drill string, requiring a channel to be cut through the supporting component, and potentially affecting the structure of the component by weakening the component integrity or creating a site for stress concentrations.

Thus, it is presently recognized that implementing a sensor that determines the structural change of a component (e.g., through an indirect means such as by not being mounted on the component itself) may reduce a cost associated with determining the forces acting on the component. As such, some embodiments of the present disclosure are directed to sensors and processes in which the sensor is coupled to an alternative component of the drill string (e.g., in relation to the drill collar or other component where strain is being measured) and nevertheless detects forces on the other component. The alternative component may be coupled to the first component (e.g., drill collar) such that deformations of the drill collar are transmitted onto the alternative component. The sensor may then determine the transmitted deformations, which are associated with the deformations of the drill collar. In some embodiments, the alternative component is another existing component of the drill string, such as a chassis or an electronic control board coupled to the drill collar. Thus, the sensor may directly determine deformations of the existing component, and indirectly determine the deformation of the drill collar or other component supporting the existing component. In additional or alternative embodiments, the alternative component is a supplemental component that is coupled to an existing component of the drill string. The supplemental component may enable the sensor to be coupled to an existing component more easily than by directly attaching the sensor to the existing component. In this way, the sensor may determine deformations of the supplemental component, and deformations of the supplemental component can correspond with deformations of the existing component, the drill collar, or both. In any case, the drilling system may be operated or a structural condition of the drilling system may be monitored based on the deformations determined by the sensor.

To help illustrate the techniques described herein, FIG. 1 illustrates an example environment that includes an embodiment of a drilling system 10 at a well site, in which the drilling system 10 may be used to form a wellbore 12 through land or offshore geological formations 14. In some embodiments, the drilling system 10 facilitates milling operations to cut metal, composite, elastomer, or other objects that are typically within the wellbore 12, plugging and abandonment operations to close the wellbore 12, hydraulic fracturing or slot recovery operations to stimulate or expand hydrocarbon recovery, remedial operations to improve downhole conditions or tooling, or any number of other downhole operations. The drilling system 10 may include a drill string 16 suspended within the wellbore 12 and the drilling system 10 may have a bottom hole assembly (BHA) 18 that includes a drill bit 20 at its lower end, in which the drill bit 20 engages the geological formations 14. In this disclosure, the drill bit 20 includes any cutting structure (e.g., a reamer, mill, etc.) that may be used to engage and cut the geological formations 14, wellbore casing, or other downhole materials.

The drilling system 10 also includes a surface system 22 that rotates and drives the drill string 16. In some embodiments, the drilling system 10 includes a kelly system having a rotary table 24, a kelly 26, a hook 28, and a rotary swivel 30. The drill string 16 may be coupled to the hook 28 through the kelly 26 and the rotary swivel 30. The rotary swivel 30 may be suspended from the hook 28 that is attached to a traveling block (not shown) that drives the drill string 16 relative to the surface system 22 along an axis 32 that extends through a center of the wellbore 12. The rotary swivel 30 may permit rotation of the drill string 16 relative to the hook 28, and the rotary table 24 may rotate in a rotational direction 33 to drive the drill string 16 to rotate concentrically about the axis 32. Alternatively, the drilling system 10 may be a top drive system that rotates the drill string 16 via an internal drive (e.g., an internal motor) of the rotary swivel 30. That is, the drilling system 10 may not use the rotary table 24 and the kelly 26 to rotate the drill string 16. Rather, the internal drive of the rotary swivel 30 may drive the drill string 16 to rotate in the rotational direction 33 relative to the hook 28 concentrically about the axis 32. In still other embodiments, a downhole motor (e.g., positive displacement motor, turbine motor, etc.) may include a drive shaft that is coupled to the drill bit 20 and used to rotate the drill bit 20. The drill string 16 may not rotate in such embodiments, or may rotate but with the downhole motor providing the primary rotational force to the drill bit 20.

In any case, as the surface system 22 or downhole motor rotates the drill string 16, and weight is applied to the drill bit 20 (e.g., through gravity), the drill string 16 may be driven in axial directions to engage the drill string 16 with the geological formations 14. For example, the drill string 16 may be driven into the geological formation 14 through the wellbore 12 in a first axial direction 34, which may be a generally downward/downhole vertical direction. Additionally, the drill string 16 may be removed from the wellbore 12 in a second axial direction 36 opposite the first axial direction 34. That is, the second axial direction 36 may be a generally upward/uphole vertical direction. The axial movement of the drill string 16 with rotational movement of all or a portion of the drill string 16 may facilitate engagement of the drill bit 20 with the geological formations 14. Although FIG. 1 illustrates that the drill string 16 is driven in generally vertical directions, the drill string 16 may navigate through the wellbore 12 in directions that deviate from the first and second axial directions 34, 36, such as angled directions or directions that enable a transition to a generally horizontal direction.

The surface system 22 may also include mud or drilling fluid 40 that may be directed into the drill string 16 to cool and lubricate the drill bit 20, and to carrying cuttings upwardly to the surface. Additionally, the drilling fluid 40 may exert a mud pressure on the geological formations 14 to reduce likelihood of fluid from the geological formations 14 flowing into or out of the wellbore 12. In some embodiments, the drilling fluid 40 is stored in a tank or pit 42 located at the well site. A pump 44 may fluidly couple the pit 42 and the swivel 30, in which the pump 44 may deliver the drilling fluid 40 to the interior of the drill string 16 via a port in the swivel 30, causing the drilling fluid 40 to flow downwardly through the drill string 16 in the first axial direction 34. The drilling fluid 40 may also exit the drill string 16 via ports in the drill bit 20 or other portions of the drill string 16, and flow into the wellbore 12 toward the surface (e.g., toward the surface system 22). While drilling, the drilling fluid 40 may circulate upwardly in the second axial direction 36 through an annulus region between the outside of the drill string 16 and a wall of the wellbore 12, thereby carrying drill cuttings away from the bottom of the wellbore 12. Once at the surface, the returned drilling fluid 40 may be filtered to separate the cuttings, and the fluid can be conveyed back to the pit 42 for recirculation and reuse.

The BHA 18 of the drilling system 10 of FIG. 1 may include various downhole tools, such as a logging-while-drilling (LWD) module 120 or a measuring-while-drilling (MWD) module 130. Generally, the downhole tools may facilitate determining or controlling a performance of the drill string 16, such as by determining a parameter of the drill string 16, determining a parameter of the surrounding geological formation 14, communicating with the surface, and the like. It should also be noted that more than one LWD module 120 or MWD module 130 may be employed. For example, the BHA 18 may include an additional LWD or MWD module 120A, 130A nearer the drill bit 20. As such, references made to the LWD module 120 may also refer to the LWD module 120A and references made to the MWD module 130 may also refer to the MWD module 130A.

The LWD module 120, the MWD module 130, or both, may each be housed in a special type of drill collar that couples to the drill string and which may contain one or more types of logging or measurement tools. In general, the LWD module 120 may include capabilities for measuring, processing, and storing formation or environmental information, and the MWD module may contain one or more devices for measuring characteristics of the drill string 16 or drill bit 20, as well as for communicating with surface equipment. In the drilling system 10 of FIG. 1, the LWD module 120 or the MWD module 130 may include one or more of the following types of measuring devices: a weight-on-bit (WOB) measuring device; a torque measuring device; a bend measuring device; a vibration measuring device; a shock measuring device; a stick-slip measuring device, a direction measuring device; an inclination measuring device; a temperature measuring device; a pressure measuring device; a rotational speed measuring device; or a position measuring device.

In certain embodiments, the MWD module 130 includes an apparatus for generating electrical energy. For example, the MWD module 130 may include a mud turbine generator that generates electrical energy from the flow of the drilling fluid 40. In additional or alternative embodiments, the drilling system 10 includes a power source 148, such as an electrical generator or an electrical energy storage device, that supplies energy to the drilling system 10. In any case, electrical energy may be used to operate the aspects of the drilling system 10, such as to control the BHA 18.

The BHA 18 may further include a motor 150, a rotary-steerable system (RSS) 152, or other modules (e.g., crossovers, hydraulic release, circulation, etc.) coupled to the drill bit 20. A motor 150, RSS 152, or other module may be directly coupled to the LWD module 120, MWD module 130, other modules, or to the drill bit 20, or via one or more additional tubulars 154. The motor 150 and the RSS 152 are used to regulate operation of the drill bit 20 to engage with the geological formations 14. For example, the RSS 152 may orient the drill bit 20 in a desirable direction while the motor causes the drill bit 20 to rotate continuously to drill the wellbore 12. Generating continuous rotation may enable improved transportation of drilled cuttings to the surface, better cutting of the wellbore 12 (e.g., improved wellbore quality, reduced stick-slip or bit whirl, etc.), limited stress imparted upon the drill bit 20 by the geological formations 14, and so forth. Furthermore, the RSS 152 may enable control of the engagement of the drill string 16 with the geological formations 14. By way of example, the RSS may place the drill string 16 in communication with the surface system 22. As such, the surface system 22 may control a direction or path for the drill string 16 to form the wellbore 12 or a manner the drill string 16 engages with the geological formations 14 (e.g., a rotation vs. sliding of the drill string 16).

In some embodiments, the drill string 16 includes or is communicatively coupled to a data processing system 160 that can adjust the operation of the drilling system 10, such as to direct the drill string 16 through the wellbore 12 or the path of the drill string 16 when extending the wellbore 12. The data processing system 160 may include one or more processors 162, such as a general purpose microprocessor, an application specific processor (ASIC), or a field programmable gate array (FPGA) or other programmable logic device, or combinations of the foregoing. Processors 162 may execute instructions stored in a memory 164 or other storage 166, which may be read-only memory (ROM), random-access memory (RAM), flash memory, optical storage media, a hard disk drive, and the like. The data processing system 160 may further be communicatively coupled to a sensor 167 that may determine an operating parameter of the drill string 16. As an example, the sensor 167 may be a strain gauge (e.g., any embodiment of a strain gauge or strain gauge circuit discussed herein, or combinations thereof) that facilitates determining a strain or deformation of a section of the BHA 18, and the sensor 167 may directly or through other components transmit signals or feedback to the data processing system 160 indicative of the determined strain/deformation. The data processing system 160 may operate the drilling system 10, such as to adjust the direction through which the drill string 16 forms the wellbore 12, based on the feedback received from the sensor 167.

Although the illustrated embodiment of the data processing system 160 is located external to the drill string 16, the data processing system 160 may alternatively be wholly or partially a part of the drill string 16, such as within the BHA 18. The data processing system 160 may include a device proximate the drilling operation (e.g., at the surface system 22, in the BHA 18, etc.) or a remote data processing device located away from the drilling system 10, such as a mobile computing device (e.g., tablet, smart phone, laptop, desktop computer, etc.) or a server remote from the drilling system 10. In any case, the data processing system 160 may process downhole measurements in real-time, in near real-time, or sometime after the data has been collected. In general, the data processing system 160 may store and process collected data, such as data collected by the BHA 18 via the LWD module 120, the MWD module 130, the sensor 167, or any suitable telemetry (e.g., electrical signals pulsed through the geological formations 14 or mud pulse telemetry using the drilling fluid 40). In further embodiments, separate data processing systems 160 may be used to direct, orient, or control the drill string 16, to rotate the drill string 16 (e.g., with surface torque, by flowing fluid to a downhole motor, etc.), or to raise or lower the drill string 16.

In some embodiments, the data processing system 160 may also include a user interface 168 that allows a user to interact with the data processing system 160. For example, the user may input properties, instructions (e.g., control commands), or parameters to the data processing system 160 via the user interface 168. To this end, the user interface 168 may include a button, a keyboard, a microphone, a mouse, a trackpad, a touch screen, an audio input device, or the like. The user interface 168 may also include a display, which may be any suitable electronic display that is displays visual representations of information, such as graphical representations of collected data.

Further still, the data processing system 160 may include input/output (I/O) ports 170 that enable the data processing system 160 to communicate with various electronic devices. For example, the I/O ports 170 may enable the data processing system 160 to directly couple to another electronic device (e.g., a remote or mobile device) to enable data to transfer between the data processing system 160 and the electronic device. The I/O ports 170 may additionally or alternatively enable the data processing system 160 to indirectly couple to other electronic devices. In another example, the I/O ports 170 may enable the data processing system 160 to couple to a network, such as a personal area network (PAN), a local area network (LAN), a wide area network (WAN), or any combination of the foregoing. Accordingly, in some embodiments, the data processing system 160 does one or more of receiving data (e.g., as signals) from another electronic device (e.g., a base-station control system) via the I/O ports 170 or communicating data to another electronic device via the I/O ports 170.

Figure 2:
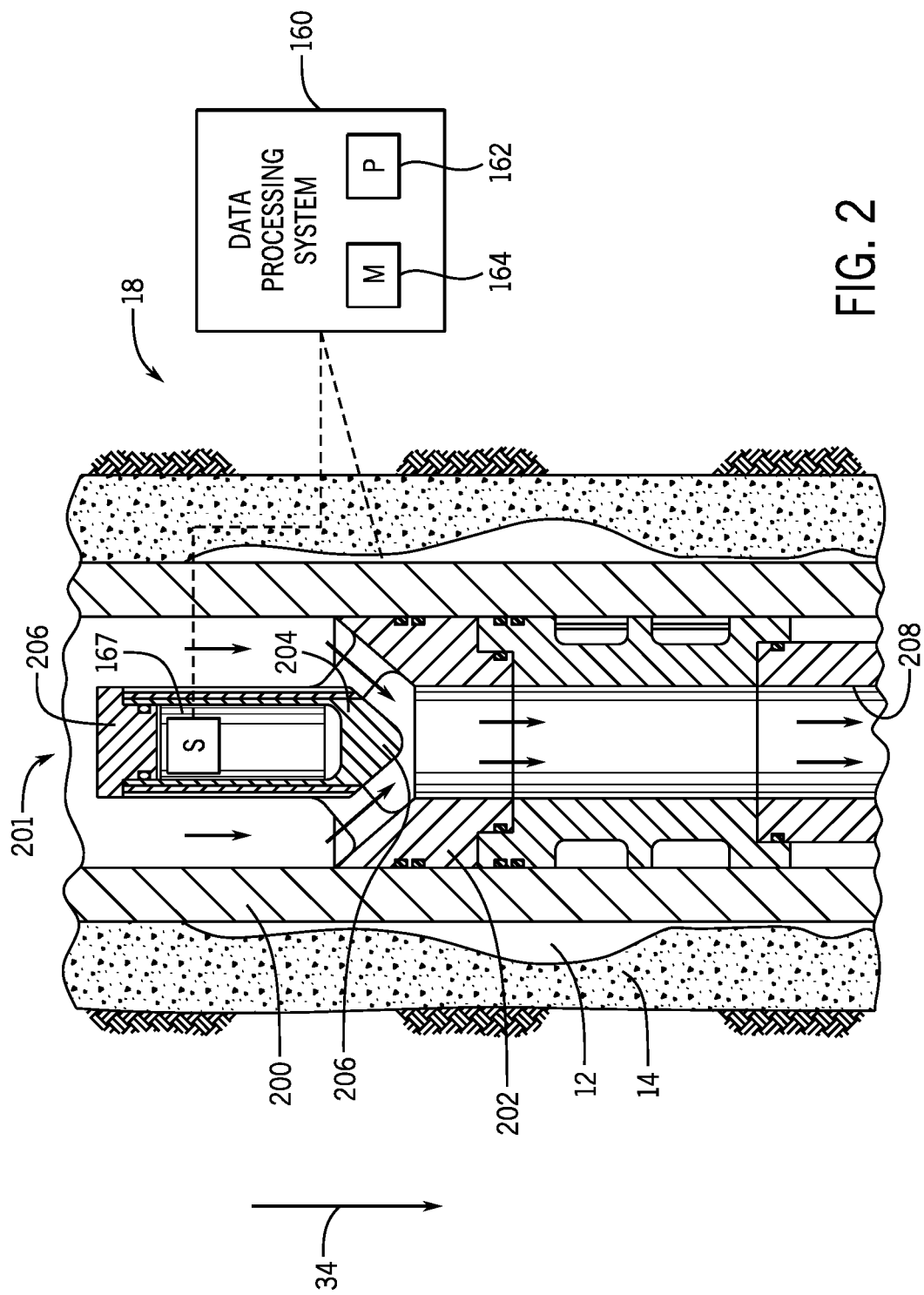
FIG. 2 is a partial section view of a bottom hole assembly (BHA) having a drill collar, according to an embodiment of the disclosure.

FIG. 2 is a partial section view of a BHA 18 according to some embodiments of the present disclosure. The illustrated embodiment of the BHA 18 includes a drill collar 200 that, among other things, provides a weight to the BHA 18. Through gravity, the provided weight supplies a force in the first axial direction 34 to engage the geological formation 14 and form the wellbore 12 while drilling. In some embodiments, the data processing system 160 may control the amount of weight exerted by the drill collar 200 to form the wellbore 12 (e.g., by controlling how much of the weight of the drill string is carried by the surface system or a downhole hanger).

The BHA 18 may include a mandrel assembly or other internal assembly 201, which generally refers to an assembly of components within and potentially fully or partially enclosed by the drill collar 200. The internal assembly 201 may extend along at least a partial length of the drill collar and can include multiple components that can each be referred to as a chassis. For instance, a first chassis 202 may support or include physical components, tools, or sensors of the internal assembly 201, and is in some embodiments referred to as a tool chassis. A second chassis 204 may support other physical components, tools, or sensors of the internal assembly 201, and is in some embodiments referred to as an instrumentation chassis 204. In at least some embodiments, the chassis 204 encloses or supports instrumentation tools of the BHA 18, such as the sensor 167.

The chasses 202, 204 may have any suitable construction. For instance, the chassis 202, the chassis 204, or both, may have an annular construction. Chassis 202, for instance, is illustrated as being annular and having a flow path therethrough. Chassis 204 of this embodiment is shown as having an internal compartment, but without a flow path extending fully therethrough. In some embodiments, the chassis 202, the chassis 204 may include or be formed as a flow diverter 206 that directs the drilling fluid 40 through the BHA 18 to the drill bit 20. The flow diverter 206 in FIG. 2, for instance, is included in or formed by the chassis 204 and is within annular fluid flow and directs fluid flow into the flow path within the chassis 202. More particularly, the drilling fluid 40 may be directed around the chassis 204 and away from instrumentation tools within the chassis 204, and the flow diverter 206 may then cause the drilling fluid 40 to converge into a passage 208 within the tool chassis 202. The drilling fluid 40 can then be directed in a downhole direction within the passage 208, such as toward a drill bit 20 (see FIG. 1).

As mentioned herein, it may be difficult or inefficient to implement a sensor (e.g., a strain gauge) to determine the deformation associated with the BHA 18 to control operation of the BHA 18. For example, in conventional approaches, placing a sensor on the drill collar 200 to directly determine the deformation of the drill collar 200 may be expensive or difficult to implement (e.g., having limited robustness making it unsuitable for downhole use). As such, the sensor 167 may be positioned in an alternative position, such as within the internal assembly 201 or within a pocket or cavity formed in the BHA 18 (e.g., along the chassis 204, in a lid/cover of an internal assembly 201, or in a pocket or cavity on an internal surface of the drill collar 200), or an alternative sensor may be used to determine the deformation associated with the BHA 18. In some embodiments, the sensor 167 in alternative locations (e.g., in a lid of a pocket or a plate attached to a lid) may enable or facilitate further embodiments, such as pressure measurement. In some embodiments, the sensor 167 optionally does not directly determine the deformation of the drill collar 200 (e.g., using a sensor on the drill collar 200 where strain is desired), but may determine another parameter that is representative of the deformation of the drill collar 200.

In certain circumstances, the BHA 18 may be subject to bending strains, some of which may drive the BHA 18 to travel in an undesirable direction while forming the wellbore 12 or which may weaken or fatigue the BHA 18. Thus, a strain gauge (e.g., a foil strain gauge, a fiberoptic strain gauge, a piezoresistor strain gauge, a Micro-Opto-Electro-Mechanical Systems (MOEMS) strain gauge, a vibrating wire strain gauge, a capacitive strain gauge, and so forth) may be used to determine the bending strain undergone by the BHA 18. As an overview, each strain gauge may include an electrical circuit through which a current having an associated voltage may travel. The electrical circuit may include a resistance that correlates with a length of the strain gauge. By way of example, increasing the length of the strain gauge may increase the resistance of the strain gauge, and decreasing the length of the strain gauge may decrease the resistance of the strain gauge. The resistance may be provided by a conductor or resistor, and may be determined, for instance, by applying a voltage through the electrical circuit, sensing a voltage that has traveled the electrical circuit, and determining the difference between the applied voltage and the sensed voltage.

A strain gauge may determine a change of the resistance of a resistor or of the full strain gauge in which the change of the resistance is correlated with a change of the length of the strain gauge (i.e., a deformation). In some embodiments, the strain gauge may provide signals or feedback indicative of the resistance, and another component (e.g., a controller) may receive the signal and use the resistance to determine a change in length of the strain gauge and a corresponding deformation of the strain gauge. In additional or alternative embodiments, the strain gauge may provide signals or feedback directly indicative of the deformation. As an example, the strain gauge may be attached to a component. The component may undergo a deformation that changes a length of the component, and the deformation may change the length of the strain gauge, thereby changing the resistance of the strain gauge. The strain gauge may then transmit a signal indicative of the change in resistance associated with a deformation of the strain gauge. In still other embodiments, the strain gauge may record deformation measurements, resistance changes, or the like either in local storage media, or by transmitting the data to another component which stores the information.

Figure 3:
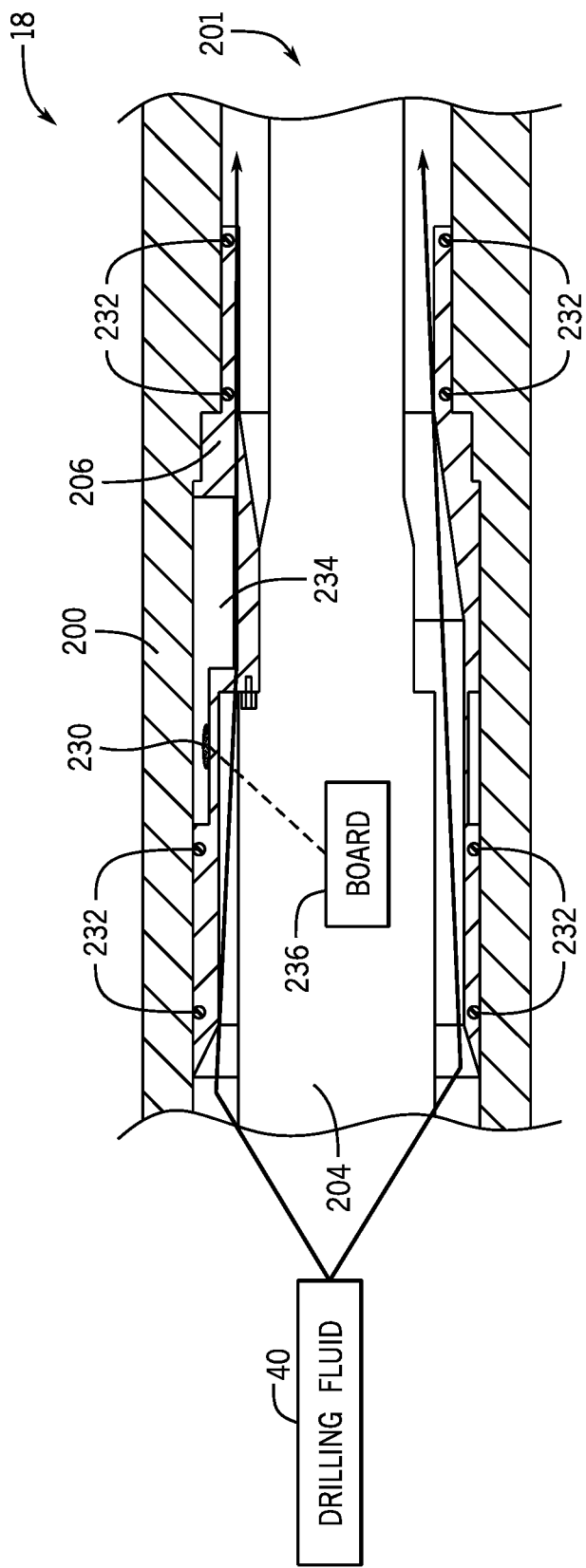
FIG. 3 is a section view of a BHA having a strain gauge coupled to a BHA component such as a flow diverter, according to an embodiment of the disclosure.
Figure 4:
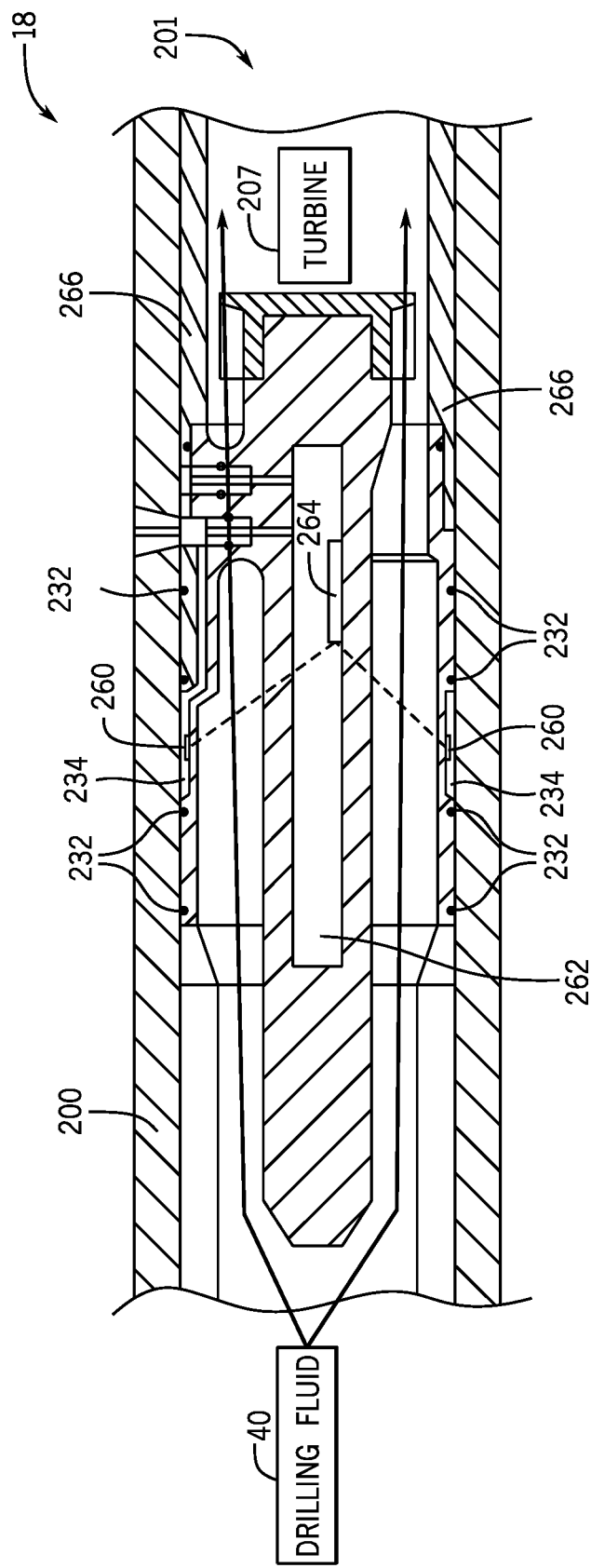
FIG. 4 is a section view of a BHA having a strain gauge coupled to a BHA component such as a flow diverter according to another embodiment of the disclosure.

FIGS. 3-5 illustrate embodiments in which a strain gauge is coupled to various existing components of a BHA 18, other than directly being bonded to the drill collar 200. Such strain gauges may be used to determine bending of the component of the BHA 18 that is within the drill collar 200, and the determined bending may be correlated with the bending of the BHA 18 and drill collar 200. Although FIGS. 3-5 primarily discuss using the strain gauge to determine the bending of the BHA 18 or drill collar 200, the strain gauge may additionally or alternatively facilitate determining other types of deformations of the BHA 18, such as torsional or axial strains.

FIG. 3 is a section view of an embodiment of the BHA 18 in which a strain gauge 230 is coupled to or integral with a flow diverter 206 of an internal assembly 201. It should be noted that the flow diverter 206 may be integral with or manufactured separately from the drill collar 200 and the chassis 204. Particularly when the flow diverter 206 is wholly or partially manufactured as a separate component, the strain gauge 230 may be conveniently and easily attached and detached from the flow diverter 206. Thus, if an installed flow diverter 206 is to be replaced with a replacement flow diverter 206, the same strain gauge 230 may be detached from the installed flow diverter 206 and attached to the replacement flow diverter 206, thereby limiting the cost of replacing flow diverters 206. As mentioned herein, the flow diverter 206 may direct the drilling fluid 40 that is flowing in a downhole direction, such as toward a drill bit 20 (FIG. 1). For example, the flow diverter 206 may direct the drilling fluid 40 around the chassis 204 through the BHA 18. The flow diverter 206 may be located in a near-bit position (e.g., within 10 ft. (3 m) from the drill bit 20), and the flow diverter 206 may be considered a lower flow diverter. As such, the flow diverter 206 may direct the drilling fluid 40 directly into the drill bit 20.

A strain gauge 230 may facilitate determining a deformation of the chassis 204 or the flow diverter 206 as transmitted from a deformation of the drill collar 200. In some embodiments, the BHA 18 may include one or more seals 232 (e.g., O-rings, square rings, T-rings, I-rings, X-rings, Q-rings, etc.) that surround the flow diverter 206. The seals 232 may abut both the flow diverter 206 and the drill collar 200 to increase friction between the flow diverter 206 and the drill collar 200. For example, a first side (e.g., upstream side) of one of the seals 232 may be of high pressure (e.g., in contact with high pressure fluid), and a second side of the seals 232 may be of low pressure. Furthermore, the flow diverter 206 experience high pressure as well (e.g., be filled with the high-pressure fluid). The pressure differential between the flow diverter 206 and the low pressure at the second side of the seal 232 may cause the flow diverter 206 to radially expand, thereby pushing the outer surface of the seals 232 against the inner surface of the drill collar 200. The amount of force imparted to push the seals 232 radially against the drill collar 200 may be based on various parameters, such as a length of the flow diverter 206, a gap between the flow diverter 206 and the drill collar 200, a thickness of the flow diverter 206, and so forth, to control the restriction of dynamic movement between the flow diverter 206 and the drill collar 200. In this manner, the seals 232 facilitate restricting axial movement (e.g., sliding) between the flow diverter 206 and the drill collar 200, and the deformations of the drill collar 200 may be directly transmitted to the chassis 204 and/or flow diverter 206 and determined using the strain gauge 230. As such, in some embodiments, the strain gauge 230 may facilitate determining the deformations associated with the drill collar 200.

In the illustrated flow diverter 206, the strain gauge 230 is attached to the flow diverter 206 within a chamber 234 radially between an outer surface of the flow diverter 206 and an inner surface of the drill collar 200. Accordingly, in this embodiment, the flow diverter 206 acts as a chassis for the strain gauge 230. The chamber 234 may be filled with a fluid (e.g., oil) that may increase the pressure between the drill collar 200 and the flow diverter 206, and the strain gauge 230 may be within a pocket, cavity, or recess of the chamber 234. The pressure from the fluid may balance the pressure exerted by the drilling fluid 40 flowing through the flow diverter 206, thereby restricting deformation of the flow diverter 206 caused by the flow of the drilling fluid 40, and the recess of the chamber 234 is optionally sealed to cover the strain gauge 230, thereby shielding the strain gauge 230 from the fluid. In some embodiments, there may be components (e.g., a piston, a bellows, a diaphragm) configured to transmit pressure between the drilling fluid 40 and the fluid within the chamber 234 to balance the pressure between the chamber 234 and within the flow diverter 206, or to otherwise reduce deformation of the flow diverter 206 caused by a pressure differential between the chamber 234 and within the flow diverter 206.

In at least the embodiments in which the flow diverter 206 is in a near-bit position, the deformations determined using the strain gauge 230 may be extrapolated or otherwise used in some embodiments to determine a position of the drill bit 20. The BHA 18 may then be controlled to direct the drill bit 20 based on the position. For instance, the strain gauge 230 may be communicatively coupled to a first electronics board 236 (e.g., a first control board) within the chassis 204, such as via physical wiring routed through the flow diverter 206. The first electronics board 236—which may include a controller or processor—may receive signals (e.g., resistance readings of the strain gauge 230) indicative of strain undergone by the strain gauge 230, determine deformation undergone by the strain gauge 230 based on the signals, determine or estimate a position or orientation of the drill bit 20 based on the deformation (e.g., based on determining or inferring the bending experienced by the drill collar 200), and operate the BHA 18 based on the determined position of the drill bit 20 or drill collar 200. Additionally or alternatively, the first electronics board 236 may receive signals indicative of strain and store information regarding the strain for further analysis (e.g., determining deformations of various operations to, for instance, improve future designs or operation modeling).

FIG. 4 is a section view of an embodiment of the BHA 18 in which a strain gauge 260 is within the internal assembly 201 (e.g., in an optional pocket or cavity of the internal assembly 201) on an additional or alternative flow diverter 206. In some embodiments, the flow diverter 206 of FIG. 4 is farther from the drill bit than the flow diverter 206 of FIG. 5 (e.g., 20 ft. (6 m) to 2000 ft. (600 m)). When used with a lower flow diverter, the flow diverter 206 of FIG. 4 may be considered an upper flow diverter. In at least some embodiments, the upper flow diverter 206 of FIG. 4 may be adjacent to (or near) a turbine 207 that generates or otherwise provides electrical power to the BHA 18, or to a mechanical flow diverter. In FIG. 4, for instance, the flow diverter 206 is uphole of the turbine 207 and diverts the fluid flow in advance of the fluid entering the turbine 207.

The flow diverter 206 may include a cavity 262 in which other components (e.g., a second electronics or control board 264) may be located, and the flow diverter 206 may direct the drilling fluid 40 around the cavity 262 toward the drill bit 20. The strain gauge 260 may be attached to the flow diverter 206 in another chamber 234, which may be filled with a fluid to optionally reduce the pressure differential between the chamber 234 and the flow channel within the flow diverter 206, and to reduce deformation caused by the pressure differential.

The BHA 18 may further include the seals 232 that facilitate increasing the friction between the flow diverter 206 and the drill collar 200, thereby further enabling the deformation of the drill collar 200 to transmit to the flow diverter 206, and vice versa. In the illustrated embodiment, the strain gauge 260 may be communicatively coupled to a second electronics board 264 within the flow diverter 206, such as via physical wires routed through the flow diverter 206. Such wires may also be routed through a sleeve 266 of the BHA 18, which sleeve 266 is optionally a chassis for the flow diverter 206, or is a tubular element. Additionally or alternatively, the strain gauge 260 may be wirelessly coupled to the second electronics board 264. In further embodiments, the strain gauge 260 may be coupled to another electronics board, such as the first electronics board 236 in the chassis 204 of FIG. 3. In any case, the electronics board coupled to the strain gauge 260 may receive signals indicative of strain undergone by the strain gauge 260 to determine bending of the drill collar 200 which may also correspond to a position or orientation of the drill bit 20, operate the BHA 18 based on the determined position of the drill bit 20 or bending of the drill collar 200, or store deformation information based on the signals.

FIG. 5 is a schematic section view of an embodiment of the BHA 18 in which a strain gauge 290 is attached to the chassis 204 within the internal assembly 201. In the illustrated embodiment, the chassis 204 is centered within the drill collar 200 via one or more centralizers 292. Movement of the drill collar 200 may be transmitted to the chassis 204 via the centralizers 292. Accordingly, bending of the drill collar 200 may bend the chassis 204 as a result of centralization from the centralizers 292. The strain gauge 290 may then facilitate determining the bending of the chassis 204 and, therefore, estimate the bending of the drill collar 200. The strain gauge 290 may be coupled to the chassis 204 in any suitable manner. For instance, the strain gauge 290 may be directly coupled to an outer or surface of the chassis 204. In other embodiments, the strain gauge 290 may be coupled to a flow diverter or other tool formed or carried by the chassis 204, or may be within a pocket or chamber as described with reference to FIGS. 3 and 4

In some tool designs and environments, certain strains of the drill collar 200 may not directly or proportionately transmit to the chassis 204. For instance, this may occur where the drill collar 200 may move axially or radially relative to the chassis. The radial gap between the outer surface of the centralizers 292 and the inner surface of the drill collar 200, as well as the radial gap between the centralizers 292 and a pressure housing 294 (see FIG. 6) surrounding the chassis 204, may affect (e.g., reduce) the bending of the chassis 204. Thus, the reading of the strain gauge 290 may not be directly equal or be proportionate to the deformation of the drill collar 200. For this reason, in some embodiments, the reading of the strain gauge 290 may be calibrated or adjusted to compensate for any bending measurement losses to provide a more accurate representation of the deformation of the drill collar 200.

In certain embodiments, it is not be desirable place a strain gauge on certain components of the BHA 18. For instance, the strain gauge may be attached to the BHA 18 in a controlled environment by trained personnel to enable the strain gauge to accurately determine deformations of the BHA 18. Some existing components, however, such as the chassis 204 and the drill collar 200, may be manufactured or assembled at a different location separate from the controlled environment. Thus, to attach some strain gauges to an existing component of the BHA 18, it may be desirable that the existing component be transported to a controlled environment or an additional manufacturing process be performed to enable the strain gauge 290 to determine deformations of the existing component. Such additional operations can increase time or cost to implement the strain gauge.

Some embodiments therefore include installing an additional component on the BHA 18, on which an alternative sensor is attached to determine a deformation of the additional component. The additional component may then be attached to an existing component of the BHA 18, and the reading of the deformation of the additional component may be associated with the deformation of the existing component, the drill collar, and the BHA 18, without having to install the strain gauge directly on the BHA 18. In other words, attaching the alternative sensor to the additional, separate component and attaching the additional component to existing components may be easier, more cost effective, and more convenient than attaching a strain gauge directly onto an existing component. The alternative sensor may then be communicatively coupled to the data processing system 160, to the first electronics board 236, to a data storage device, or to any suitable component that may control the operation of the BHA 18, or store deformation information based on the reading of the alternative sensor.

As an example, FIG. 6 is a schematic section view of an embodiment of the BHA 18 having an internal assembly 201 that includes a chassis 204. The chassis 204 of this embodiment includes a rod 310 (which may be solid or tubular) within a compartment 312 of the chassis 204, and the rod 310 is used to determine bending of the BHA 18. In some embodiments, opposing axial ends 314 of the rod 310 terminate near an axial center of one of the centralizers 292 to enable the movement of the centralizers 292 to bend the rod 310 effectively, such that the bending of the rod 310 substantially matches the bending of the BHA 18. As will be described in FIGS. 7-13, there may be various embodiments of a rod that facilitate determining the bending of the BHA 18 in different manners. It should be noted that the BHA 18 may include any combination of the discussed embodiments of the rods. For example, different embodiments of the disclosed rods may be implemented at various lengths along the BHA 18. Moreover, such embodiments of the additional component or alternative sensor may be used in addition to (e.g., to confirm measurements of) or as an alternative to the embodiments attaching the strain gauge to the BHA 18 as discussed in FIGS. 3-5.

Figure 7:
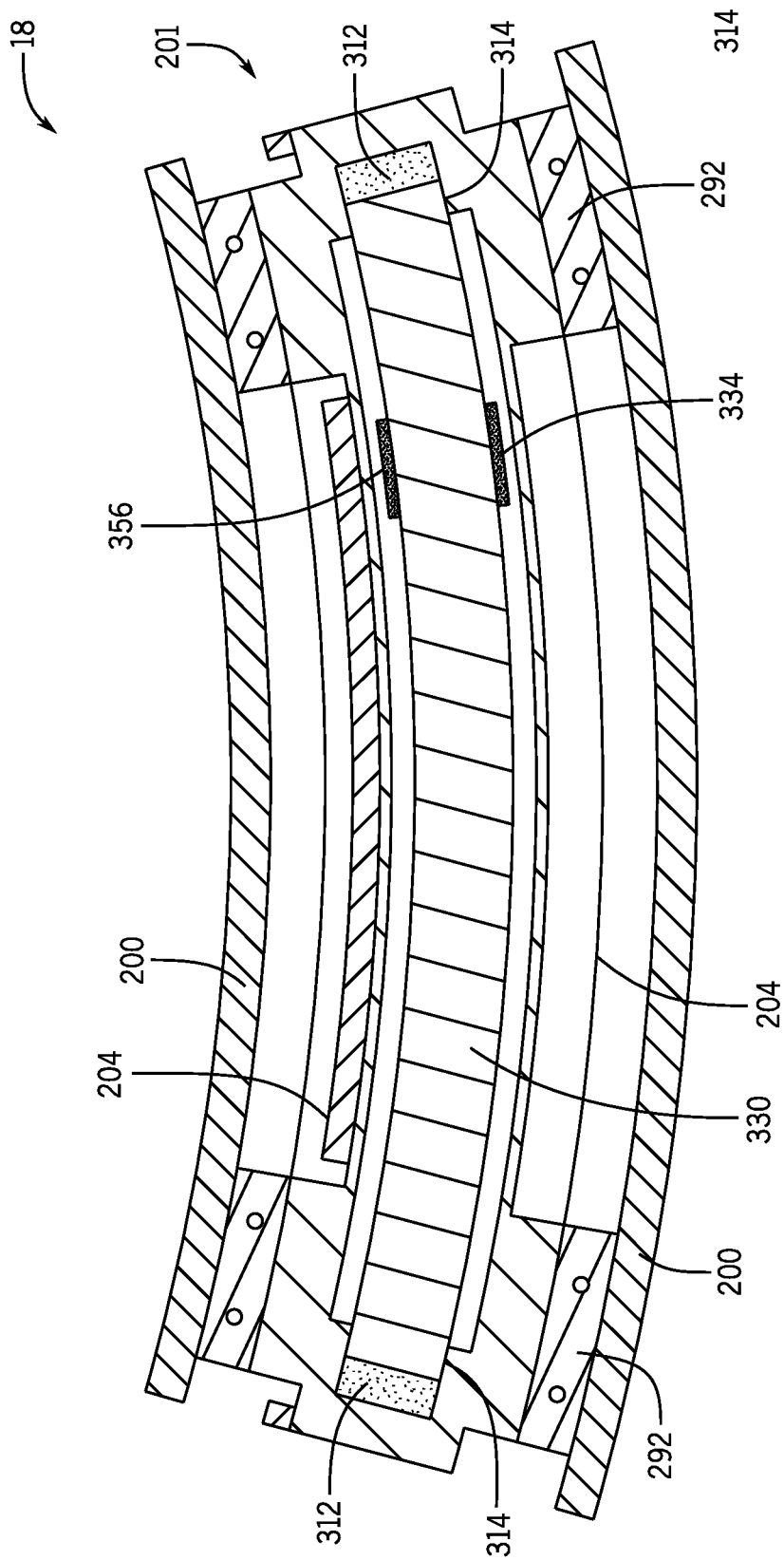
FIG. 7 is a schematic section view of a BHA having a rod within a chassis compartment, in which the BHA is undergoing bending, according to an embodiment of the disclosure.

FIG. 7 is a schematic section view of an embodiment of the BHA 18 with an internal assembly 201 having a first rod 330. In the illustrated embodiment, the first rod 330 is positioned within a compartment 312 and internal to a chassis 204. The first rod 330 may be substantially coupled to the chassis 204, such that deformations of the chassis 204 are transferred to the first rod 330. By way of example, the chassis 204 may impart a clamping force onto the ends 314 of the first rod 330. Thus, deformations of the chassis 204 (e.g., caused by deformations of the drill collar 200) may also cause deformations of the first rod 330. Furthermore, a strain gauge 334 can be attached to the first rod 330, such as near one or both of the ends 314 to enable greater accessibility of and accurate measurements by the strain gauge 334. The strain gauge 334 may be used to determine the deformations of the first rod 330. The deformations of the first rod 330 may then be used to determine the deformations of the BHA 18 as the deformations from the BHA 18 can be transmitted to the chassis 204, and from the chassis 204 to the first rod 330. The first rod 330 may have any suitable cross-sectional shape, and is optionally a uniform cross-sectional shape along its length to enable the deformations of the first rod 330 to be transmitted evenly through the length of the first rod 330, such that deformations of the first rod 330 are not affected by variations of the geometry of the first rod 330 to cause an inaccurate reading by the strain gauge 334.

It should be noted that for the illustrated embodiment, the first rod 330 and the strain gauge 334 may be assembled together in a process that is separate from the manufacturing process of the chassis 204 to the BHA 18. For example, the first rod 330 and the strain gauge 334 may be attached to one another in a controlled environment to enable the strain gauge 334 to facilitate determining deformations of the first rod 330 accurately, and the first rod 330 that then includes the strain gauge 334 may then be attached to the chassis 204 in a separate environment or process. In this manner, the chassis 204 does not have to be at the same the controlled environment to install the strain gauge 334 within the BHA 18, thereby reducing a cost to manufacture and assemble the BHA 18 having the strain gauge 334.

Figure 8:
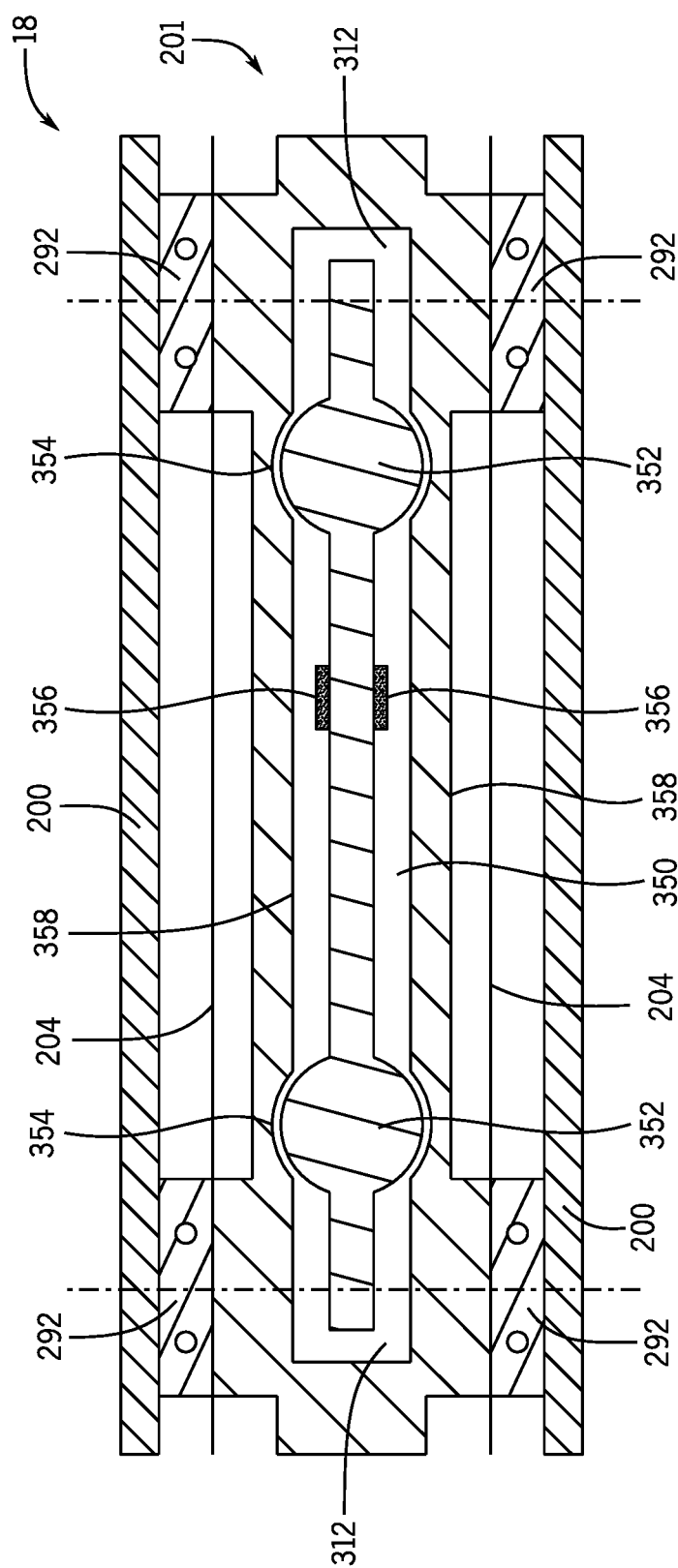
FIG. 8 is a schematic section view of a BHA having a rod within a chassis compartment, according to an embodiment of the disclosure.

FIG. 8 is a schematic section view of an embodiment of the BHA 18 with an internal assembly 201 having a second rod 350 that is also optionally within a compartment 312 of the chassis 204. In the illustrated embodiment, the second rod 350 includes two bulging (e.g., ball-shaped) portions 352 and the compartment 312 includes two recessed sections 354. Each recessed section 354 substantially captures one of the bulging portions 352 of the second rod 350, thereby forming a joint (e.g., a ball joint) that holds the second rod 350 within the compartment 312. One or more proximity sensors 356 may be coupled to the second rod 350 or, additionally or alternatively, to a wall 358 of the compartment 312. The proximity sensor 356 may include a Hall Effect sensor, an optical sensor, a capacitive sensor, another suitable sensor, or a combination of one or more of the foregoing, and may determine a distance between the second rod 350 and the wall 358. The determined distance between the second rod 350 and the wall 358 may correspond to bending of the chassis 204 and the BHA 18

For example, FIG. 9 is a schematic section view of the BHA 18 of FIG. 8 in a bent configuration. In the bent configuration, the BHA 18, the chassis 204, and the compartment 312 are bending, but the second rod 350 remains straight or at least exhibits less bending. For instance, bending of the compartment 312 causes the recessed sections 354 of the compartment 312 to move or rotate around the bulging portions 352 of the second rod 350. Movement of the curved sections 354 around the bulging portions 352 may avoid imparting a force onto the second rod 350 that would cause corresponding bending of the second rod 350. As such, the second rod 350 may not bend or may not bend a corresponding amount when the chassis 204 bends. In the illustrated bent configuration, a first inner wall 358A of the compartment 312 has moved closer to a first proximity sensor 356A that is illustratively on an outer surface of the rod 350, and a second inner wall 358B of the compartment 312 has moved away from a second proximity sensor 356B that is illustratively on the outer surface of the rod 350. Thus, the first proximity sensor 356A may determine that the distance between the second rod 350 and the first wall 358A has decreased, and the second proximity sensor 356B may determine that the distance between the second rod 350 and the second wall 358B has increased. The proximity sensors 356 may then transmit signals or feedback (e.g., to the first electronics board 236) indicative of the distance between the second rod 350 and the wall 358. Such feedback may then be used to determine the amount that the chassis 204 and the BHA 18 are bending. For instance, the distance or change of distance between the second rod 350 and the wall 358 may be associated with an angle of bending of the BHA 18 (e.g., a greater change of distance corresponds to a greater amount of bending). Although the illustrated embodiment has two proximity sensors 356 attached to the second rod 350 (e.g., to measure bending in more than one plane), in alternative or additional embodiments, any suitable number of proximity sensors 356 may be attached to the second rod 350, such as one proximity sensor 356, or more than two proximity sensor 356. Moreover, rather than placing proximity sensors at a single axial position along the rod 350, one or more other proximity sensors may be offset at different axial positions.

FIG. 10 is a schematic view of an embodiment of a third rod 380 that is optionally fully or partially in the compartment 312 of the chassis 204, and which can be used to determine bending of the BHA 18. In the illustrated embodiment, the third rod 380 is in an unbent configuration. An emitter 382 (e.g., a laser or a light-emitting diode) within the third rod 380 may emit a light 384 that has a low dispersion (e.g., a collimated laser beam) axially along and through at least a portion of the third rod 380, which can be tubular for this embodiment. The emitted light 384 may travel along the third rod 380 to a photodetector array 386 capable of detecting the presence of the light 384, and which may send a signal or store an output upon detecting the presence of the light 384. The particular position of the light 384 emitted across the third rod 380 onto the photodetector array 386 may be determined based on the reading of a certain photodetector of the photodetector array 386 detecting the light 384. The position of the light 384 may be used to determine an amount of bending of the rod 380 and thus the BHA 18. For example, bending of the BHA 18 may also bend the third rod 380 to change where the light 384 is emitted onto the photodetector array 386. Thus, the amount of bending of the BHA 18 may be determined based on the determined position of the light 384 emitted onto the photodetector array 386.

FIG. 11 is a section view of the third rod 380 of FIG. 10 taken along lines 11-11 of FIG. 10. In the unbent configuration of the third rod 380, the light 384 is substantially centered in the photodetector array 386, assuming the emitter 382 is centered with the photodetector array 386. When the third rod 380 is substantially straight, the emitter 382 can therefore emit the light 384 onto the center of the photodetector array 386. As such, a determination that the light 384 is positioned at the center of the photodetector array 386 is indicative that the third rod 380 and the BHA 18 is substantially straight. In other embodiments, a known offset between the emitter 382 and the photodetector array 386 may be used so that a position of the light at a location off-center may indicate that the third rod 380 and BHA 18 are substantially straight.

Figure 12:
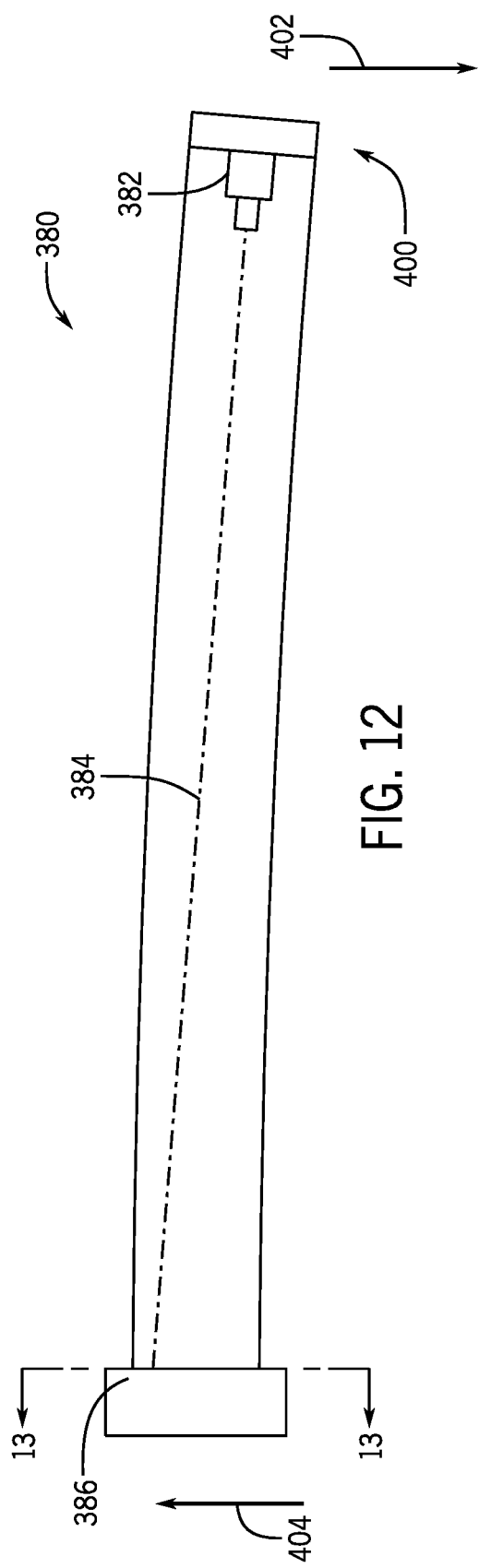
FIG. 12 is a schematic view of the rod of FIG. 10 in a bent configuration, according to an embodiment of the disclosure.

FIG. 12 is a schematic view of the third rod 380 of FIGS. 10 and 11, but now in a bent configuration. As shown in FIG. 12, in the bent configuration, the light 384 emitted by the emitter 382 is positioned off-center upon the photodetector array 386. In the particular embodiment, the bending of the third rod 380 caused by moving an end 400 of the third rod 380 in a first lateral direction 402 (e.g., due to bending of the BHA 18) may cause the photodetector array 386 to emit the light 384 at an angle toward a second lateral direction 404 opposite the first lateral direction 402 onto the photodetector array 386. Alternatively, the bending of the third rod 380 caused by moving the end 400 of the third rod 380 in the second lateral direction 404 (e.g., due to bending of the BHA 18) may cause the emitter 382 to emit the light 384 at another angle toward the first lateral direction 402 onto the photodetector array 386.

Figure 13:
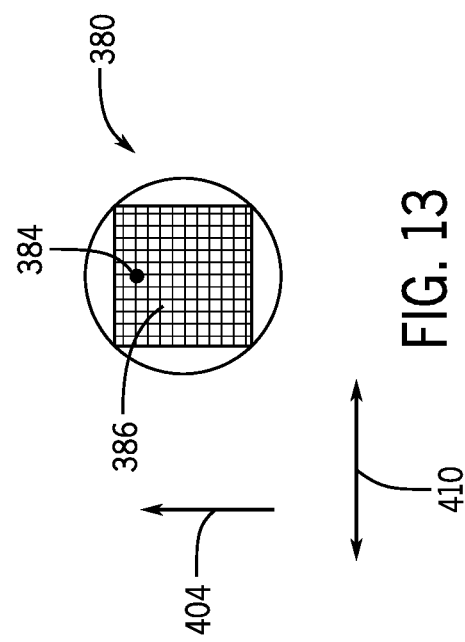
FIG. 13 is a section view of the third rod of FIG. 12 taken along lines 13-13, according to an embodiment of the disclosure.

FIG. 13 is a section view of the third rod 380 of FIG. 12 taken along lines 13-13. As mentioned above, the light 384 is positioned above the center of the photodetector array 386 along the second lateral direction 404. In some embodiments, the particular position of the light 384 on the photodetector array 386 may be associated with a particular amount of bending of the third rod 380. For example, a position of the light 384 that is farther from the center of the photodetector array 386 may indicate a greater amount of bending of the third rod 380. Although the illustrated embodiment depicts the light 384 as positioned off-center on the photodetector array 386 in the second lateral direction 404 (shown vertical in the orientation of FIG. 13), the light 384 may additionally or alternatively be positioned in other locations on the photodetector array 386, such as along a third lateral direction 410 that is perpendicular to the first and second lateral directions 402, 404 (and which is shown in a horizontal direction in FIG. 13). In this way, the specific position of the light 384 on the photodetector array 386 may be used to determine the angle at which the third rod 380 is bent. Where the photodetector array 386 is known to be offset relative to the emitter 382 when the rod 380 is in an unbent configuration, the known offset can be used with detection of the position of the light 384 on the photodetector array 386 to determine the bending of the rod 380 and thus the BHA 18 and optional chassis 204.

The techniques described with reference to FIGS. 3-13 may be used to determine bending deformation of the BHA 18 through transmission of bending of the BHA 18 to the drill collar 200 and an internal assembly 201 within the drill collar 200. The same or other techniques are optionally available for other types of deformations, including torsional or axial strains of the drill collar. In addition, it may be desirable to attach sensors to the BHA 18 in other manners. For example, in some cases, attaching strain gauges onto an existing component in a controlled environment by trained personnel may be undesirable as it can increase costs associated with transporting the strain gauge or the associated component (e.g., the chassis 204), training the personnel, preparing and maintaining the controller environment, and so forth. As such, it may be desirable to implement sensors to the BHA 18 without installing the strain gauges onto the BHA 18 in the controlled environment.

FIGS. 14-20 relate to embodiments for placing multiple strain gauges on an intermediate component (e.g., an electronics board or other plate) of a BHA 18 (e.g., coupled to a chassis or collar) to determine one or more types of deformations. It may be easier to attach the strain gauges onto the intermediate component than other existing components of the BHA 18 (e.g., the chassis 202, chassis 204, drill collar 200, or flow diverter 206). As an example, multiple strain gauges may be implemented onto an intermediate component in the controlled environment, and then the intermediate component may be coupled to a chassis 204 or drill collar 202 outside of the controlled environment. For this reason, the chassis 204 and other components of the BHA 18 do not have to be transported to the controlled environment or otherwise handled in the controlled environment for purposes of implementing the strain gauge. Thus, such a process may be easier, more convenient, less costly, less time-consuming, and more efficient than directly attaching the strain gauges onto the chassis 204 in the controlled environment, for example.

Figure 14:
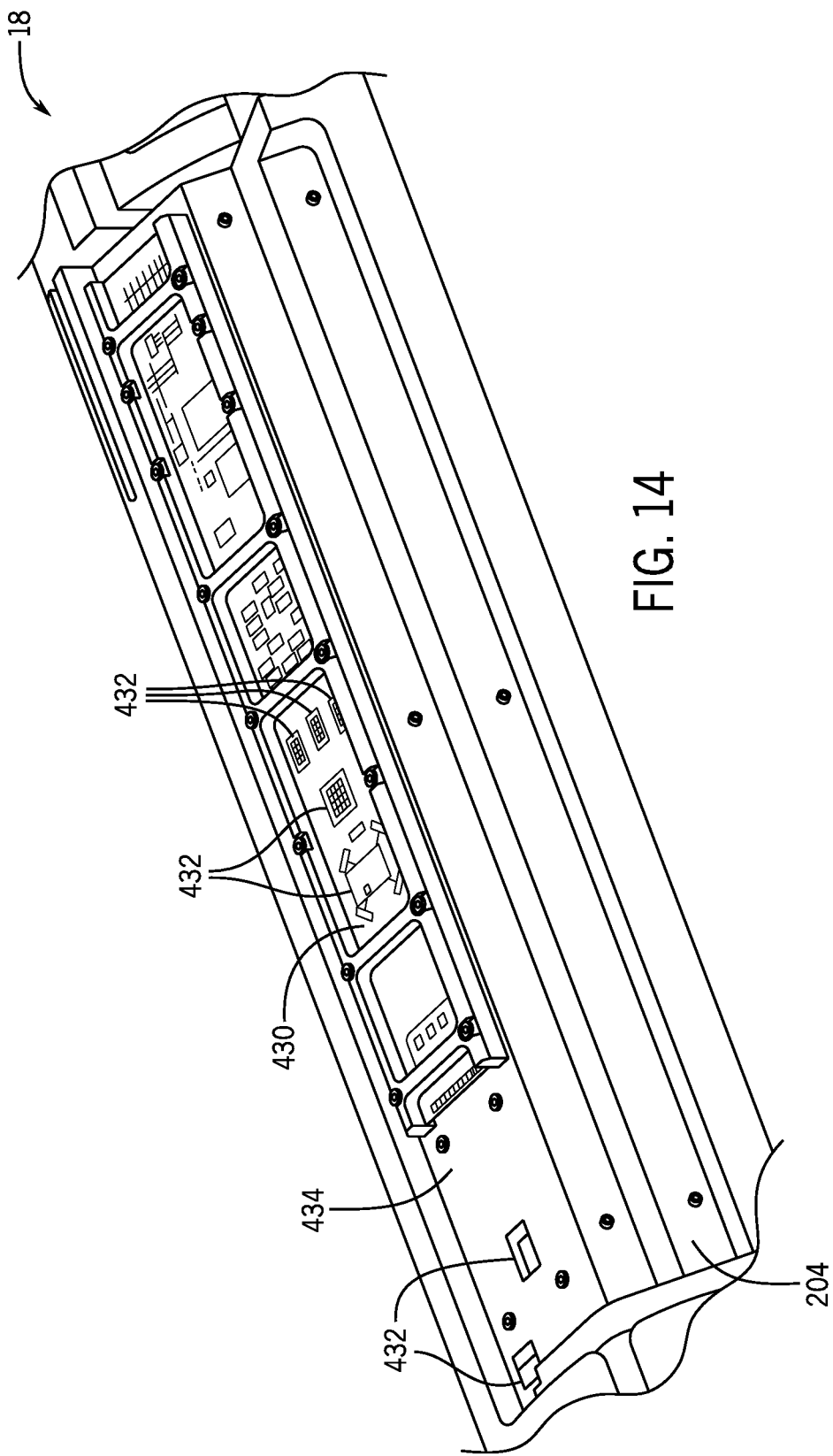
FIG. 14 is a perspective view of a BHA having an electronics board that includes multiple strain sensors, according to an embodiment of the disclosure.

FIG. 14 is a perspective view of an embodiment of the BHA 18. In FIG. 14, certain components, such as a separate drill collar 200, are not illustrated for better visualization of other aspects of the BHA 18. The BHA 18 may include an electronics board 430 (e.g., a third control board) coupled to the chassis 204. The electronics board 430 may be used in operation of the BHA 18, such as based on the deformations of the drill collar 200, to measure or log data within the wellbore, to control trajectory of the wellbore, to transmit or receive data, and the like. Furthermore, the deformations of the drill collar 200 may be transmitted to the chassis 204 and onto the electronics board 430 (or from the drill collar 200 directly to the electronics board 430 where the electronics board 430 is mounted in a pocket or recess of the drill collar 200). For example, the electronics board 430 may be coupled to the chassis 204 via a fastener, a weld, an adhesive (e.g., epoxy), or another suitable component, that enables the deformation of the drill collar 200 to transmit to the chassis 204 and to the electronics board 430. In other words, for instance, an elongation of the drill collar 200 elongates the chassis 204, thereby elongating the electronics board 430 coupled to the chassis 204 (e.g., via elongation of an optional component that couples the electronics board 430 to the chassis 204 or directly to the drill collar 200). The deformations of the electronics board 430 may therefore be used to determine the corresponding deformations of the drill collar 200.

Multiple strain gauges 432 may be attached to the electronics board 430 to determine the deformations of the electronics board 430. The strain gauges 432 may include one or more different types of strain gauges, each different type providing a reading associated with a particular type of deformation of the electronics board 430. In some cases, the electronics board 430 may already be an existing component of the BHA 18 and may be used to control or monitor certain components of the BHA 18 or wellbore. In this way, attaching the strain gauges 432 directly onto the electronics board 430 may install the strain gauges 432 into the BHA 18 without having to utilize additional components, thereby limiting a cost to manufacture the BHA 18. In additional or alternative embodiments, multiple strain gauges 432 may be attached to an additional component such as a plate 434, instead of directly to the electronics board 430. The plate 434 may be coupled to or formed in the chassis 204 or the drill collar 200 via a fastener, a weld, an adhesive, another suitable component, or integral manufacturing, that enables the deformation of the drill collar 200 to transmit to the plate 434. By coupling the strain gauges 432 to the plate 434 instead of the electronics board 430, the strain gauges 432 may be easily attached to or removed from the BHA 18 even without removal of the electronics board 430 (e.g., to replace the strain gauges 432). A plate 434 may also be removable to allow removal of the strain gauges 432.

As used herein, the term "plate" is intended to cover any of a variety of different surfaces to which the strain gauges 432 may be coupled, and which are distinct from the collar enclosing an internal assembly. A plate is not limited to having planar surfaces; however, a plate of the present disclosure that is curved will generally have a radius of curvature that is at least 2, 3, 5, 10, 15, or 20 times greater than the radius of curvature of the collar or chassis to which it is attached. For instance, a chassis having an 8 in. (0.2 m) diameter and a 4 in. (0.1 m) radius may have a plate therein or thereon which is generally flat, or which has a radius of curvature of 10 in. (0.25 m) or more, 20 in. (0.5 m) or more, or 50 in. (1.3 m) or more. Additionally, even where three-dimensional or otherwise contoured in shape, a plate of the present disclosure will provide opposing surfaces that are generally parallel. In general, an annular component with a flow path therethrough would not be considered a plate for purposes of this disclosure.

Figure 15:
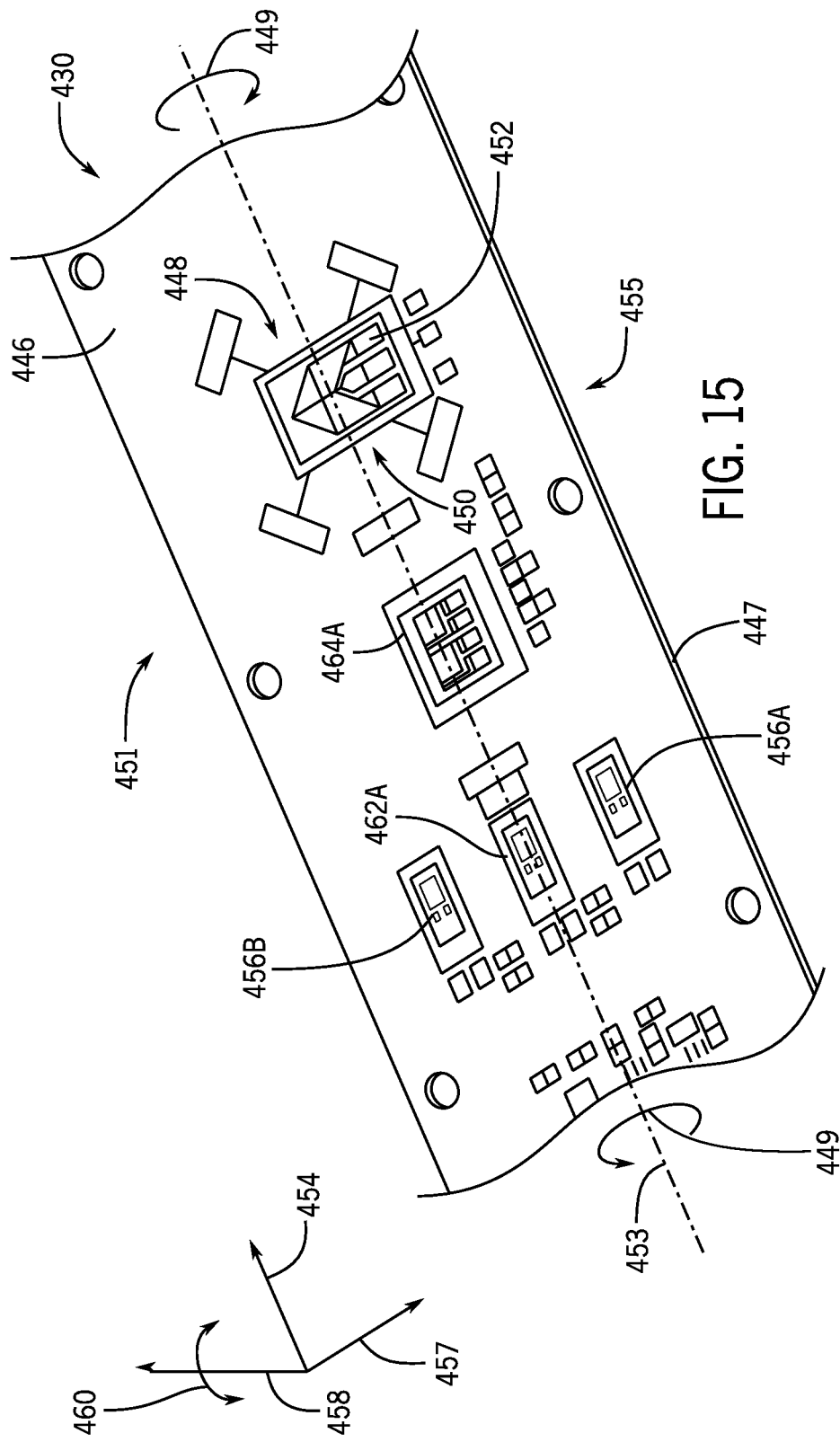
FIG. 15 is a top view of an electronics board of a BHA, in which the electronics board has multiple strain sensors attached thereto, according to an embodiment of the disclosure.

FIG. 15 is a top view of an embodiment of a first surface 446 of the electronics board 430 of FIG. 14. In the illustrated embodiment, a torsion strain gauge 452 is coupled to the first surface 446 of the electronics board 430, and is optionally oriented and positioned to be along a centerline 453 extending through the electronics board 430. Resistance readings of the torsion strain gauge 452 can be indicative of a twisting of the component (e.g., the chassis 204 or plate 434 around the centerline 453 as represented by arrows 449) to which the electronics board 430 is coupled, which twisting causing shear strain and deformation of the electronics board 430. The shear strains may elongate or shorten material fibers in a first section 448 of the torsion strain gauge 452, and a second section 450 of the torsion strain gauge 452 at an angle (e.g., at a 45° angle) to enable the resistance readings of the torsional strain gauge 452 to be affected by torsional strains. Thus, the resistance readings of the torsion strain gauge 452 may be used to determine if the component to which the electronics board 430 is coupled is undergoing torsion. However, the resistance readings of the torsion strain gauge 452 may not be substantially affected by other deformations of the electronics board 430, as other deformations may not elongate or shorten material fibers in the first section 448 and the second section 450 in the 45° angle.

Additionally, in-plane bending strain gauges 456 (including strain gauges 456A and 456B) may be on the first surface 446 of the electronics board 430. In the illustrated embodiment, a first in-plane bending strain gauge 456A is on one side 451 of the centerline 453, and a second in-plane bending strain gauge 456B is on the other side 455 of the centerline 453 and aligned with the first in-plane bending strain gauge 456A along a lateral axis 457 perpendicular to the centerline 453. The in-plane bending strain gauges 456 may be collectively used to determine a presence of bending the electronics board 430 about a vertical axis 458 (i.e., in-plane bending visible from a top view of the first surface 446). For instance, bending the electronics board 430 in a first bending direction 460 may shorten the first in-plane bending strain gauge 456A and may elongate the second in-plane bending strain gauge 456B, thereby changing (e.g., decreasing) the resistance reading of the first in-plane bending strain gauge 456A and changing (e.g., increasing) the resistance reading of the second in-plane bending strain gauge 456B. In this manner, the resistance readings of the in-plane bending strain gauges 456 relative to one another may be used to determine if the electronics board 430 is undergoing in-plane bending. The in-plane bending strain gauges 456 may not be substantially affected by other deformations of the electronics board 430, as other forms of deformations would affect geometric changes of the in-plane bending strain gauges 456 equally and, therefore, do not change resistance readings of the two in-plane bending strain gauges 456A, 456B relative to one another.

Further, a first out-of-plane bending strain gauge 462A and a first axial strain gauge 464A may also be on the first surface 446. In the illustrated embodiment, both the first out-of-plane bending strain gauge 462A and the first axial strain gauge 464A are positioned along the centerline 453. The first out-of-plane bending strain gauge 462A may be used to facilitate determining if the electronics board 430 is undergoing out-of-plane bending or bending about the lateral axis 457 (and viewable from the side surface 447 extending the length of the electronics board 430). The first axial strain gauge 464A may be used to facilitate determining if the electronics board 430 is undergoing tensile (e.g., elongation) forces or compressive (e.g., shortening) forces along the longitudinal axis 454. Such techniques will be further described herein, including with respect to FIG. 16.

Figure 16:
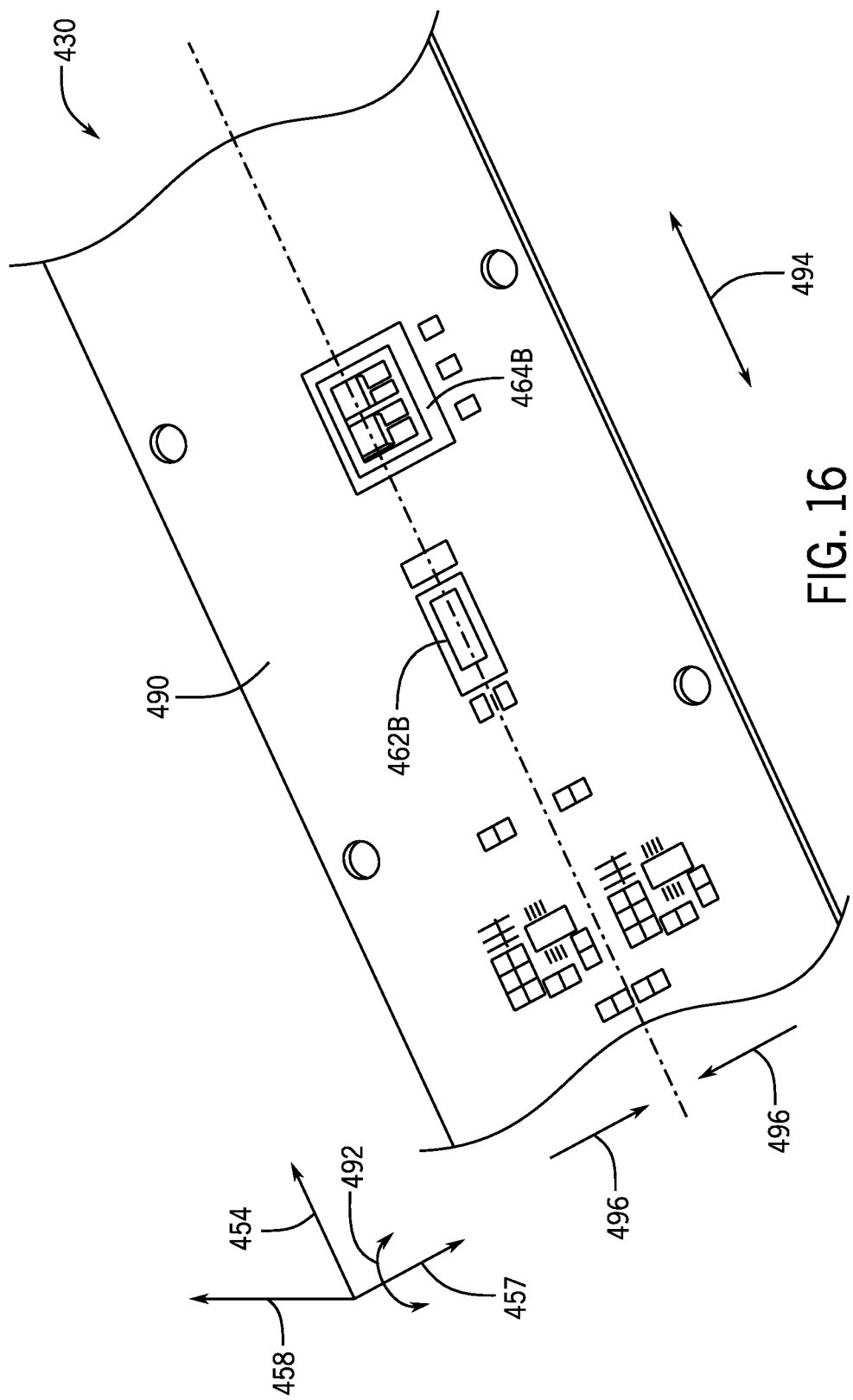
FIG. 16 is a bottom view of an electronics board of a BHA, in which the electronics board has multiple strain sensors attached thereto, according to an embodiment of the disclosure.

FIG. 16 is a bottom view of an embodiment of a second surface 490, which may be directly opposite the first surface 446 of the electronics board 430. A second out-of-plane bending strain gauge 462B may be along the centerline 453 on the second surface 490 and aligned with the first out-of-plane bending strain gauge 462A along the vertical axis 458. The resistance reading of the second out-of-plane bending strain gauge 462B relative to the resistance reading of the first out-of-plane bending strain gauge 462A may be used to determine if the electronics board 430 is undergoing out-of-plane bending. By way of example, bending the electronics board 430 about the lateral axis 457 in a second bending direction 492 may elongate the second out-of-plane bending strain gauge 462B and may shorten the first out-of-plane bending strain gauge 462A, thereby changing (e.g., increasing) the resistance reading of the second out-of-plane bending strain gauge 462B and changing (e.g., decreasing) the resistance reading of the first out-of-plane bending strain gauge 462A. In this way, the resistance readings of the out-of-plane bending strain gauges 462 relative to one another may be used to determine if the electronics board 430 is undergoing out-of-plane bending, and the resistance readings of the out-of-plane bending strain gauges 462 may not be substantially affected by other deformations of the electronics board 430.

A second axial strain gauge 464B may also be along the centerline 453 on the second surface 490 and aligned with the first axial strain gauge 464A along the vertical axis 458. The resistance reading of each of the axial strain gauges 464 may be used to determine a tensile/compressive deformation of the electronics board 430 along the longitudinal axis 454 and along the lateral axis 457. For instance, tensile forces imparted on the electronics board 430 may elongate the electronics board 430 in first axial directions 494 along the longitudinal axis 454 and, due to the Poisson-effect, the tensile forces may also shorten the electronics board 430 in second axial directions 496 along the lateral axis 457. That is, as the stretches along the longitudinal axis 454, the electronics board 430 may become thinner along the lateral axis 457, as material is pulled from the lateral axis 457 to along the longitudinal axis 454. The resistance readings of both of the axial strain gauges 464 may be indicative of the elongation of the electronics board 430 in the first axial directions 494 and the shortening of the electronics board 430 in the second axial directions 496, and the resistance readings may be associated with the tensile forces. Furthermore, by placing the first axial strain gauge 464A on the first surface 446 and the second axial strain gauge 464B on the second surface 490, other deformations of the electronics board 430 do not substantially affect the resistance readings of the axial strain gauges 464. By way of example, out-of-plane bending of the electronics board 430 in the second bending direction 492 may increase the resistance reading of the second axial strain gauge 464B and may also decrease the resistance reading of the first axial strain gauge 464A. The respective change in resistances may cancel one another out, such that the overall resistance readings of the axial strain gauges 464 are not affected by out-of-plane bending of the electronics board 430. The axial strain gauges 464 can also be unaffected by torsional and in-plane bending. Thus, strain gauges of the present disclosure can be connected with bridge circuitry so that each set of strain gauges response selectively to a specific direction or type of deformation, and is less or not at all sensitive to deformations in other directions.

In some embodiments, further sensors may be included on the electronics board 430. For example, the electronics board 430 may include sensors that determine strains caused by vibration of the electronics board 430 relative to the chassis 204, or which simply measure vibration. Such sensors may be responsive to movement of the electronics board 430 above a particular frequency (e.g., above 2.5 kHz, above 5 kHz, etc.). It should also be noted that other deformations of the electronics board 430 may not affect the deformation readings of the strain gauges 452, 456, 462, 464. As an example, temperature elevations may elongate the electronics board 430 in each direction to change the resistances of the strain gauges 452, 456, 462, 464 in a manner as not to affect the respective readings of the torsion, in-plane bending, out-of-plane bending, or axial strains. That is, temperature changes may affect a change in the material fibers of each strain gauge 452, 456, 462, 464 equally and does not change relative resistance readings that would indicate a deformation. For example, for the axial strain gauge 464, an increase in temperature may cause the electronics board 430 to elongate along the longitudinal axis 454 and along the lateral axis 457. The percentage of elongation of the first surface 446 of the electronics board 430 along the longitudinal axis 454 may be substantially equal to the percentage of elongation of the second surface 490 of the electronics board 430 along the longitudinal axis 454, and the percentage of elongation of the first surface 446 along the lateral axis 457 may be substantially equal to the percentage of elongation of the second surface 490 along the lateral axis 457. As such, there is no substantial difference in resistance readings between the axial strain gauges 464, thereby indicating there is no deformation caused by temperature changes. Thus, the signals or feedback provided by the strain gauges 452, 456, 462, 464 accurately represent the particular deformation of interest and are temperature compensated.

In additional or alternative embodiments, the strain gauges 452, 456, 462, 464 may be used to monitor a condition of the electronics board 430. That is, the readings of the deformations may be used to determine a structural integrity of the electronics board 430, such as a fatigue of solder joints or circuit traces associated with the electronics board 430. By way of example, the determined deformations of the electronics board 430 may be used to determine strain loads imparted onto the electronics board 430 or whether the electronics board 430 may be used for the operation of the BHA 18 or is to be replaced. In another example, the deformations may be used to determine how to improve the design of the electronics board 430 or to implement the electronics board 430 in a position that would limit the imparted deformations. For instance, loads imparted onto the electronics board 430 during operation of the drilling system 10 (e.g., by engagement of a drill bit or drill collar with the geological formations 14) may cause the electronics board 430 to deform. The deformations of the electronics board 430 may be used to determine manners to limit the forces imparted onto the electronics board 430 (e.g., attaching the electronics board 430 at a different location, implementing a protection system). For example, the electronics board 430 may store information regarding the deformation, and the information may be analyzed during a drilling operation or post-operation to determine the effects of the operation of the drilling system 10 on the electronics board 430.

It should be noted that different strain gauges may be used in addition to or as an alternative to the strain gauges 452, 456, 462, 464 to determine the aforementioned deformations or to determine other types of deformations. Indeed, the layout of the strain gauges strain gauges 452, 456, 462, 464 may be modified in any suitable manner to determine any particular type of deformation of interest. Furthermore, the strain gauges 452, 456, 462, 464 may be implemented along different lengths or sections of the BHA 18. As such, the deformations of different sections of the BHA 18 may be determined, so as to determine a more accurate orientation of the BHA 18 at any given moment. Moreover, although the strain gauges 452, 456, 462, 464 are depicted as foil strain gauges in the illustrated embodiment, the strain gauges 452, 456, 462, 464 may additionally or alternatively be any other suitable type of strain gauge.

Figure 17:
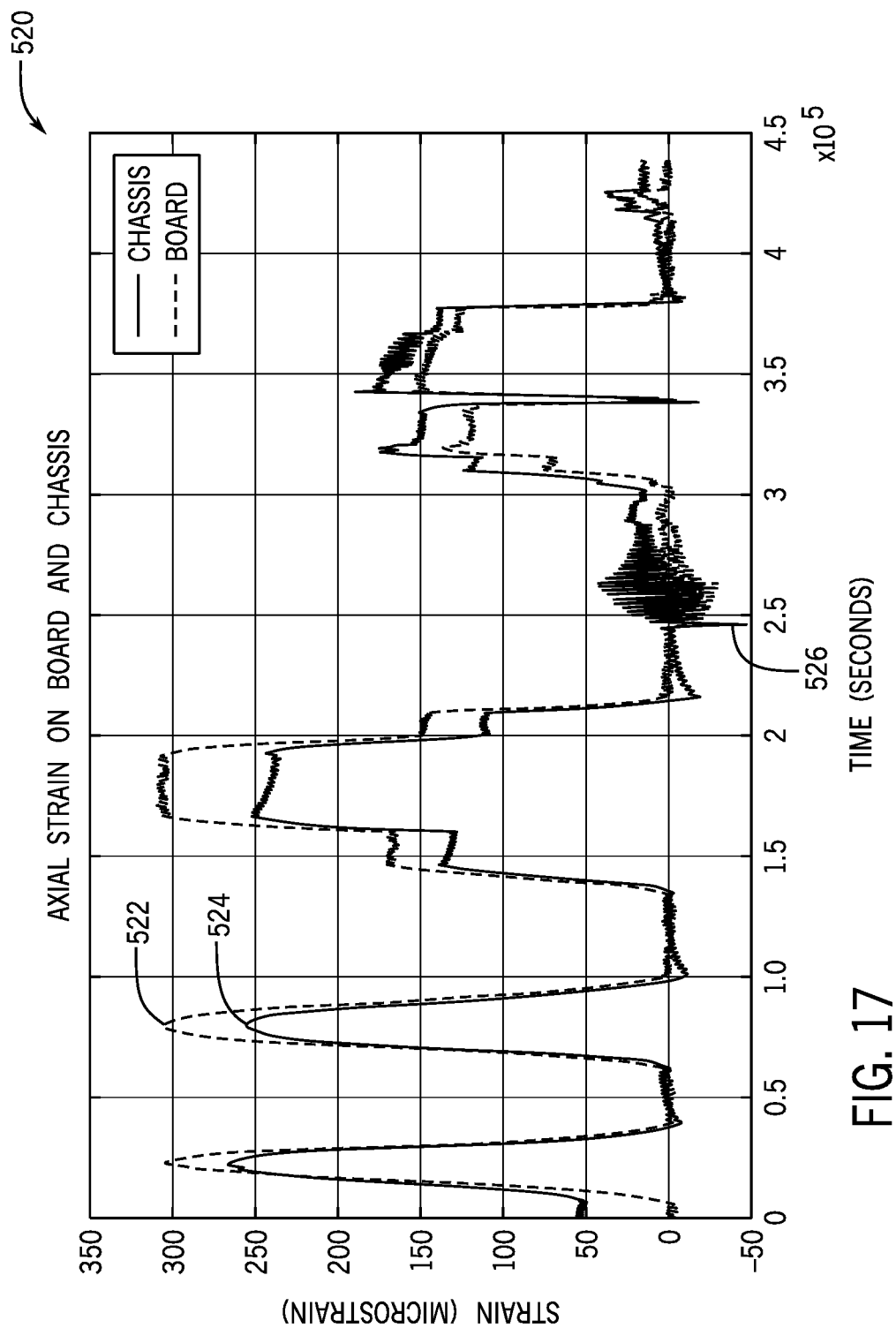
FIG. 17 is a graph of strains for different components of a BHA over time, according to an embodiment of the disclosure.

FIG. 17 is a graph 520 of strains for different components of the BHA 18 over time, during an illustrative drilling operation. A first plot 522 illustrates the strain of the chassis 204 over time and a second plot 524 illustrates the strain of the electronics board 430 over time. As shown in the graph 520, the first plot 522 and the second plot 524 generally change at the same time and direction, and therefore correspond with one another in time and direction, indicating that the strain of the electronics board 430 generally corresponds in time and direction with the strain of the chassis 204. The relative magnitudes of strain that are measured may vary in some embodiments. For instance, prior to a time 526, the first plot 522 may be consistently greater than the second plot 524. For this reason, a magnitude calibration or correction may be implemented to adjust the second plot 524 to represent the first plot 522 more accurately. After the time 526, the second plot 524 may show magnitudes consistently greater than the first plot 522. For instance, at the time 526, a particular event may affect the BHA 18 or the BHA 18 may operate in a particular operation to cause a residual strain in the electronics board 430 that causes the deformations of the electronics board 430 to be greater than the deformations of the chassis 204. As a result, upon determining such an event or operation has occurred, another magnitude calibration may be implemented to adjust the second plot 524 to represent the first plot 522 more accurately. Additionally or alternatively, the graph 520 may be used to determine whether the electronics board 430 is securely coupled to the chassis. That is, the graph 520 may be used to determine whether the electronics board 430 is to be coupled to the chassis 204 more securely to restrict movement between electronics board 430 and the chassis 204. For instance, by showing relative strains that do not correspond in time and direction, it may be determined that the electronics board 430 is moving relative to the chassis.

Figure 18:
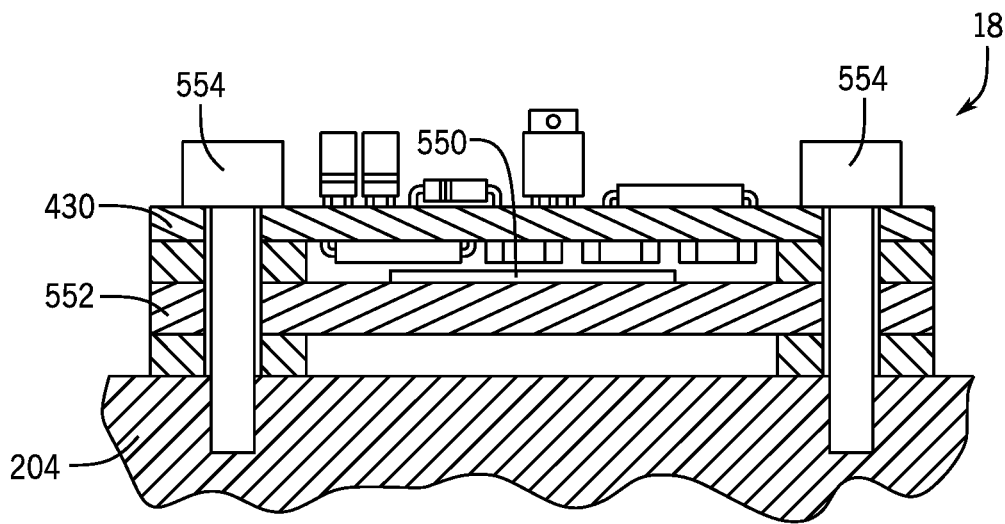
FIG. 18 is a side section view of a BHA having a strain sensor a component that is distinct from an electronics board, according to an embodiment of the disclosure.

FIG. 18 is a side section view of an embodiment of the BHA 18, in which a strain gauge 550 is coupled to a plate 552 that is separate from the electronics board 430. In the illustrated embodiment, the plate 552 is coupled to the chassis 204 and to an electronics board 430 via fasteners 554, such as screws or dowel pins (e.g., mechanical fasteners), to form a stacked configuration. The fasteners 554 may transfer deformations of the chassis 204 (or drill collar 200) onto the electronics board 430 and onto the plate 552, such that the deformations determined by the strain gauge 550 are indicative of the respective deformations of both the electronics board 430 and of the chassis 204. As such, the deformations determined using the strain gauge 550 may be used to control the BHA 18 to direct the BHA 18 through the wellbore 12, to limit the deformations of the electronics board 430, to evaluate the tool design, to evaluate operating parameters, and so forth. In additional or alternative embodiments, the plate 552 may be coupled to the chassis 204 or to the electronics board 430 via another component, such as a weld, an adhesive, a mounting feature of the plate 552, or another suitable component, which transmits the deformations of the chassis 204 onto the electronics board 430 and onto the plate 552. In further embodiments, the plate 552 may be coupled to the chassis 204 without being coupled to the electronics board 430, or the plate 552 may be coupled to the drill collar 200 (e.g., to determine the deformations of the drill collar 200 directly).

The plate 552 may be made of a material, such as a metal, metal alloy, or polymer having a low stiffness (i.e., a more elastic material) or having a thinner cross-section to enable movement of the chassis 204 to cause the plate 552 to move easily, thereby restricting other movement of the plate 552 relative to the chassis 204 (e.g., due to slip). In other words, the chassis 204 transfers strains more easily to the plate 552 without having to impart significant attachment forces to couple the plate 552 onto the chassis 204 together. Thus, the strains of the plate 552 correspond more accurately to the strains of the chassis 204. Furthermore, the plate 552 may be made of a material having a similar coefficient of thermal expansion as that of the chassis 204, such that changes in temperature do not cause the plate 552 to move relative to the chassis 204.

It should be noted that in some embodiments the plate 552 may be easily coupled to and decoupled from the chassis 204 (e.g., by unfastening or removing the fasteners 554). In some embodiments, the assembly of the strain gauge 550 and the plate 552 may be implemented and removed from the BHA 18 without moving the BHA to a controlled environment. As an example, the strain gauge 550 and the plate 552 may be easily removed from the BHA 18 and then reattached to the BHA 18, such as during maintenance, during replacement of components of BHA 18, or even at the wellsite. As another example, the strain gauge 550 and the plate 552 may be coupled to any existing BHA 18, such as to retrofit onto an existing chassis 204. In this way, the plate 552 provides greater flexibility to implement the strain gauge 550 onto a particular BHA 18.

Figure 19:
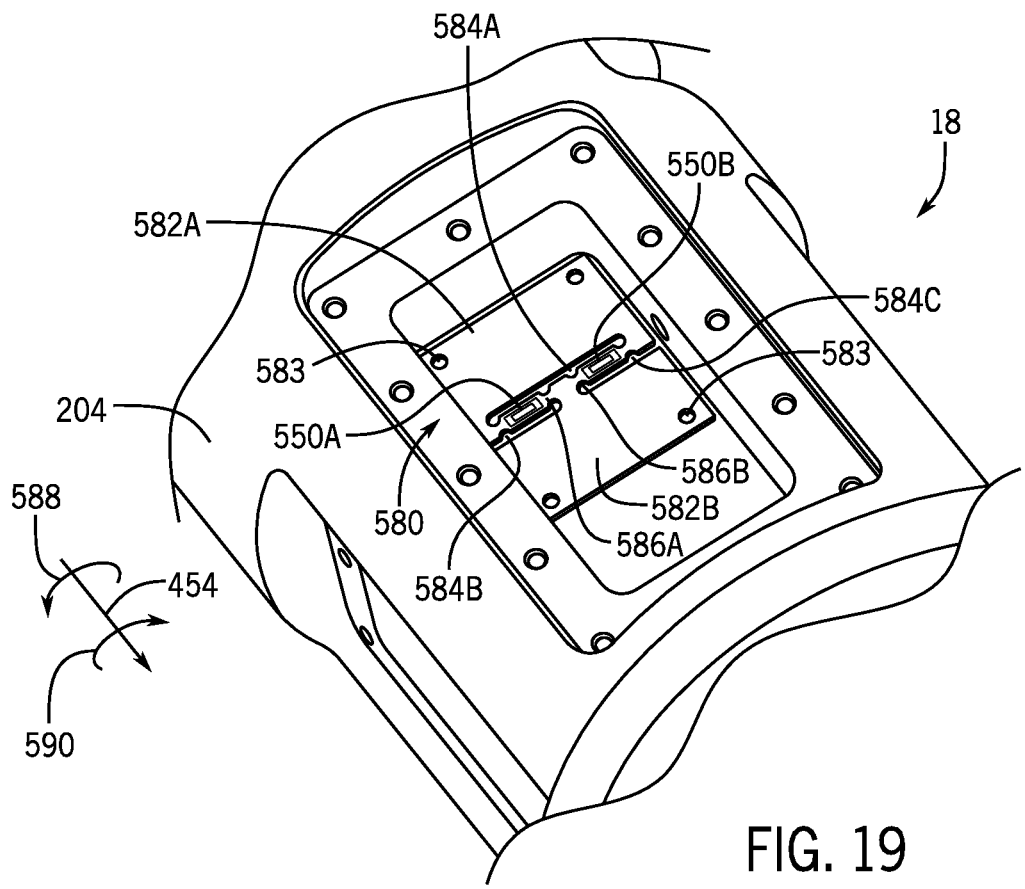
FIG. 19 is a perspective view of a BHA having a strain gauge coupled to a flexure plate, in which the flexure plate is particularly responsive to torsional strains, according to an embodiment of the disclosure.

In some embodiments, the plate 552 may be formed into a particular shape that enables the plate 552 to be more responsive to particular deformations and avoid being affected by other deformations. For example, FIG. 19 is a perspective view of an embodiment of the BHA 18 having a flexure plate 580 that may be particularly responsive to torsional strains. The flexure plate 580 may have two mounting surfaces 582A, 582B (collectively mounting surfaces 580) that may couple to the chassis 204, to the drill collar 200, or to another suitable component of the BHA 18 (e.g., within a pocket or cavity formed within the component, within a lid of a tool, etc.). In the illustrated embodiment, each of the mounting surfaces 582 includes openings 583 that enable a fastener to be inserted therethrough to couple the mounting surfaces 582 to the chassis 204, to the drill collar 200, etc. Additionally or alternatively, the mounting surfaces 582 may be coupled to the chassis 204 or to the drill collar 200 via a weld, an adhesive, and the like. The flexure plate 580 may additionally have some sections 584A, 584B, 584C (collectively sections 584) removed to form two arms 586A, 586B (collectively arms 586). In some embodiments, the arms 586 are generally centered across a width or length of the flexure plate 580. As illustrated in FIG. 19, a first section 584A of a first mounting surface 582A is removed and second and third sections 584B, 584C of a second mounting surface 582B are removed. A strain gauge 550 may then be attached to each of the arms 586.

The geometry of the flexure plate 580 may readily enable torsional deformation of the chassis 204 to transmit to the flexure plate 580. By way of example, torsional deformation of the chassis 204 can concentrate into the arms 586 and change the respective resistances of the strain gauges 550. In some embodiments, the readings of the strain gauges 550 are compared to one another to determine the torsional strain of the flexure plate 580 and of the chassis 204. For instance, the first mounting surface 582A may twist in a first rotational direction 588 and the second mounting surface 582B may twist in a second rotational direction 590 opposite the first rotational direction 588. As a result, a first arm 586A may elongate and a second arm 586B may shorten, thereby changing (e.g., increasing) a resistance reading of a first strain gauge 550A on the first arm 586A and changing (e.g., decreasing) a resistance reading of a second strain gauge 550B on the second arm 586B. The discrepancy of resistance readings between the strain gauges 550 may be used to determine the torsion of the flexure plate 580 and of the BHA 18.

The geometry of the flexure plate 580 and the placement of the strain gauges 550 on the flexure plate 580 may avoid or restrict other deformations from interfering with the torsional strain determinations. More particularly, out-of-plane bending, in-plane bending, or axial strains may not affect the resistance readings of the strain gauges 550 relative to one another, and such deformations may not be determined via the strain gauges 550. In this way, any change in the relative resistance readings of the strain gauges 550 may be a result of a torsional strain of the flexure plate 580, with minimal or no sensitivity to other types of strain.

Figure 20:
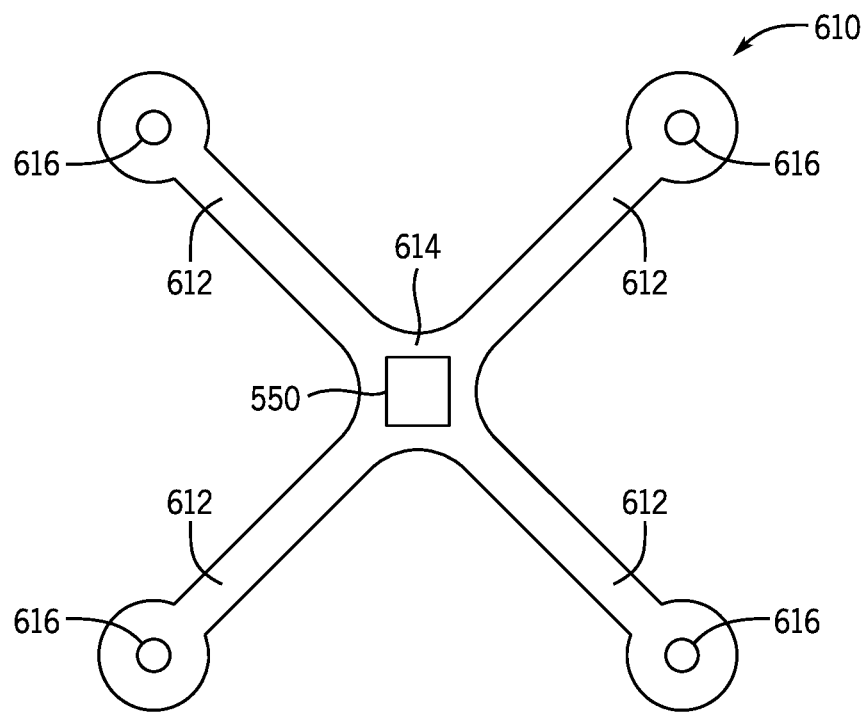
FIG. 20 is a top view of strain gauge coupled to a cross plate, in which the cross plate is particularly responsive to torsional strains, according to an embodiment of the disclosure.

FIG. 20 is a top view of an embodiment of a cross plate 610 that may be used to couple a strain gauge 550 to a chassis 202, chassis 204, drill collar 200, BHA 18, or other component. In some embodiments, the cross plate 610 concentrates torsional deformations to more readily transmit torsional strain. In the illustrated embodiment, the cross plate 610 includes four legs 612 extending away from a center section 614 that includes the strain gauge 550. Each of the legs 612 may be coupled to the chassis 204, the drill collar 200, etc. (e.g., via a fastener inserted through respective openings 616 of each leg 612). Under torsional loading of the cross plate 610 (e.g., due to torsional strain of the chassis 204), the legs 612 may move relative to one another, thereby transmitting a torsional strain onto the center section 614. The strain gauge 550, which may be similar to the torsion strain gauge 452, may then determine the transmitted torsional strain to determine the torsional strain of the BHA 18.

The cross plate 610 may enable torsional strain to be more directly transmitted onto the center section 614 to be determined by the strain gauge 550 and to provide a uniform strain field to measure the torsional strain. It should be noted that in some cases, the attachment between any plate with a component of the BHA 18 may affect a torsional strain reading associated with the plate. For example, there may be movement at the coupling points (e.g., fasteners) between a rectangular shaped plate 552 and a component of the BHA 18 during torsion of the component, such as because the plate 552 has resistance to twisting. Such movement may limit an amount of torsional strain transferred to the plate 552 and determined by the strain gauge 550, thereby affecting an accuracy of the torsional strain reading made by the strain gauge 550 to represent the torsional strain of the component. The movement may be factored into the torsional strain reading (e.g., the torsional strain reading may be calibrated or corrected based on the movement), or the movement may be restricted by adding adhesives, implementing a locking component, or other additional assembly steps. However, since the cross plate 610 enables torsional strain to be transmitted more effectively from the component onto the cross plate 610, there may be less movement at the coupling points between the cross plate 610 and the component. As a result, the torsional strain reading made by the strain gauge 550 may accurately represent the torsion of the component of the BHA 18 without having to perform the additional assembly steps.

Although FIGS. 19 and 20 each illustrates respective plates that may readily transmit torsional strain in particular, additional or alternative embodiments of plates may readily transmit a different type of deformation. In other words, the BHA 18 may employ plates having a particular geometry that concentrates a deformation other than torsional strain. Various plates may be positioned at different positions of the BHA 18. For instance, the flexure plate 580 or the cross plate 610 may be implemented at a section of the BHA 18 in which torsional strain is of particular interest, and another plate may be positioned at a different section of the BHA in which out-of-plane bending is of particular interest. Thus, the specific type of deformation of interest may be determined more accurately.

Figure 21:
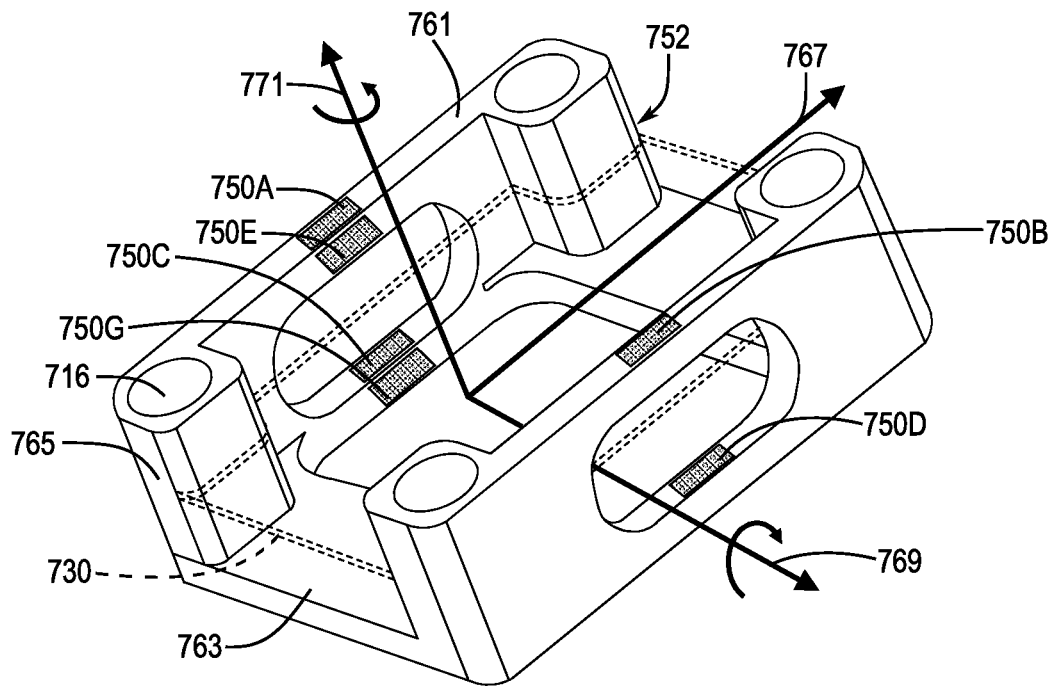
FIG. 21 is a perspective view of a three-dimensional plate for measuring bending around x- and z-axes, according to an embodiment of the disclosure.
Figure 23:
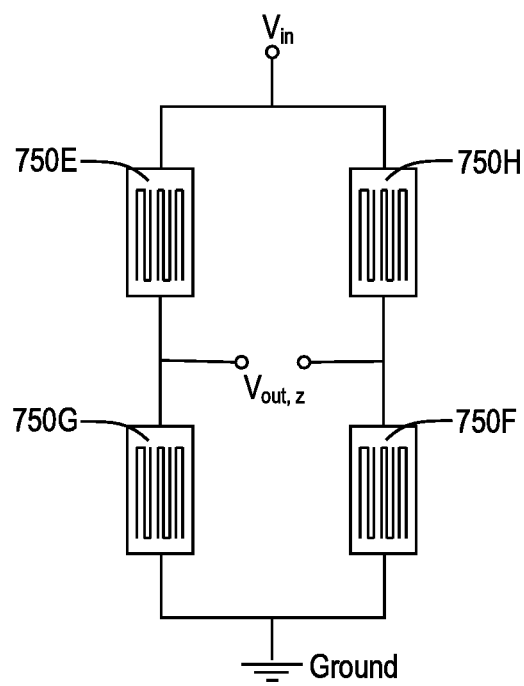
FIG. 23 is a schematic illustration of a strain gauge circuit for measuring bending around the z-axis of FIG. 21, according to an embodiment of the disclosure.

FIGS. 21 and 23 illustrate further examples of plates and designs for a force sensing structure. In the illustrated embodiment, a strain gauge arrangement is used with an electronic sensing circuit, and can be suitable for measuring bending strain in one, two, or more directions. In FIG. 21, an example plate 752 has a three-dimensional shape as represented by axes 769 (x-axis), 767 (y-axis), and 771 (z-axis). The plate 752 includes four posts 765 extending along the vertical axis 771. In this embodiment, two sidewalls 761 extend along the lateral axis 767 and vertical axis 771. The posts 765 and sidewalls 761 may provide an upright element or separation element that can be used to increase separation between strain gauges, beyond what may be provided by a relatively flat or two-dimensional plate. For instance, with a relatively flat plate, the physical separation between strain gauges may be small as it may be the thickness of the plate. As a result, the signals from the strain gauges measuring bending may also be relatively low. By providing increased physical separation, bending (e.g., out-of-plane bending) may be more readily detected as the signal may be increased, even by at least one order of magnitude.

Figure 22:
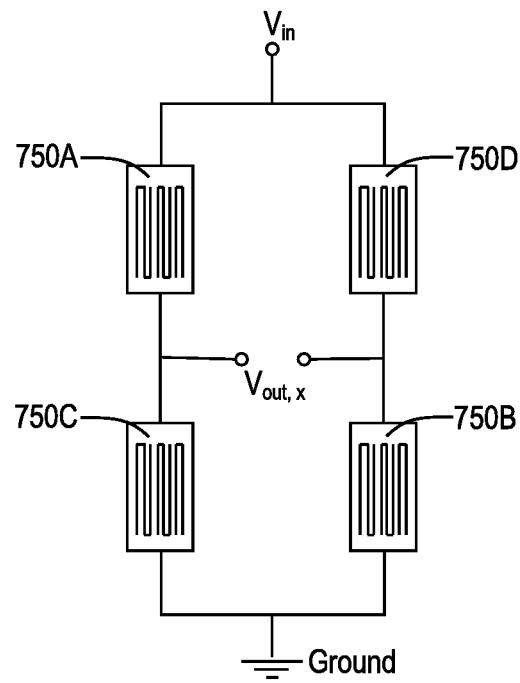
FIG. 22 is a schematic illustration of a strain gauge circuit for measuring bending around the x-axis of FIG. 21, according to an embodiment of the disclosure.

For the plate 752, bending measurements may be made along multiple bending axes, such x-axis 769 and the vertical axis 771. Bending around each axis can be measured using four strain gauges. For instance, to measure bending around the x-axis 769, four strain gauges 750A-750D may be used. As shown, the strain gauges 750A, 750B are mounted on an upper surface of the sidewalls 761. Additional strain gauges 750C, 750D may be mounted on a bottom surface of the sidewalls 761, or on another parallel surface. For instance, in FIG. 21, the sidewalls 761 include a cutout and a lower surface of the cutout provides a surface on which the strain gauges 750C, 750D are positioned. The strain gauges 750A-750D are aligned on the x-axis 769 (or aligned at a same position along the lateral axis 767), and the strain gauges 750A, 750B are at a same height on the vertical axis 771. The strain gauges 750C, 750D may also be at the same height along the vertical axis 771, but at a different height than the strain gauges 750A, 750B. That difference along the vertical axis 771 may provide a vertical or upright offset between upper strain gauges 750A, 750B and lower strain gauges 750C, 750D, which increases the differential bending signal between the two sets of gauges, which create the full Wheatstone bridge circuit of FIG. 22. As a result, when the plate 752 is deformed about the x-axis 769, the sidewalls 761 will be either in tension or compression, causing lengthening or shortening of the strain gauges 750A-750D. For instance, when bending about x-axis 769 in FIG. 21, strain gauges 750A, 750B can lengthen (increase resistance), and strain gauges 750C, 750D can at the same time shorten (decrease resistance).

The strain gauges 750E-750H may be used in an analogous manner for measuring bending about the vertical axis 771. In particular, strain gauges 750E, 750F may be located on inner surfaces of the sidewall 761, above the cutout, while strain gauges 750G, 750H may be located on inner surfaces of the sidewall 761, below the cutout. Due to such poisoning, strain gauges 750F and 750H are not visible in FIG. 21. In other embodiments, however, the strain gauges 750E-750H may be on the outer surfaces of the sidewalls 761.

The plate 752 (and the corresponding strain gauges 750A-750H and sensing circuits) is selectively responsible to the respective bending, with no or negligible amounts of cross-talk on output for bending about another axis. Thus, bending about the x-axis 769 has little or no cross-talk from bending about the vertical axis 771, and bending about the z-axis 771 likewise has little or no cross-talk from bending about the x-axis 769. Further, the described sensing circuits can compensate for any changes in ambient temperature and minimize mechanical cross-talk from other strains that are induced. Such other strains may be created by, for instance, changes in weight-on-bit (whether axial tension or compression), and those due to torsion. This can be the case as those forces produce either equal or negligibly small changes to the sidewalls 761, thereby leaving the bridge circuit balance unaffected.

The plate 752 may also be used to provide a stacked or nested structure similar to that described with respect to FIG. 18. In FIG. 21, for instance, a circuit board 730 is shown in phantom lines. The circuit board 730 may be positioned in cut-outs in the posts 765, or otherwise allowed to float between a base and upper surface of the plate 752. When positioned in such a manner, the circuit board 730 can be isolated from flexing of the structure, such as by using elastomeric mounts, or even fully potted inside using electronics potting compounds (e.g., SYLGARD available from Dow Corning Corporation). Such compounds may immobilize the board inside the plate 752, while still allowing some flexing freedom on the plate 752 to allow the sensing circuits to operate.

Figure 24:
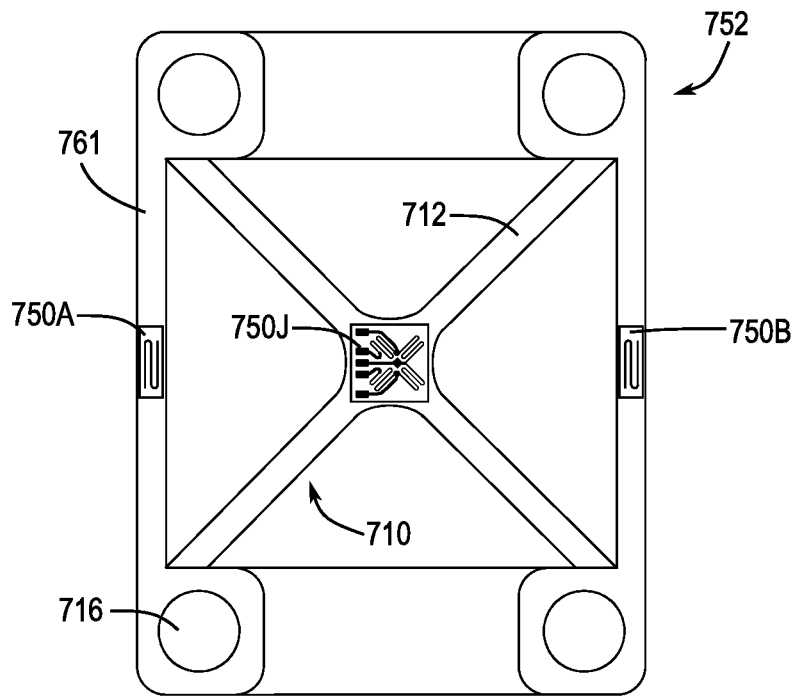
FIG. 24 is a top view of a three-dimensional plate including a cross shaped portion having a strain gauge responsive to torsional strains, according to an embodiment of the disclosure.

The plate 752 may be used to detect torsional strain (e.g., to determine torque on the plate 752, and ultimately on the drill collar 200), which is optionally done in combination with determining of bending (e.g., along x-axis 769 or the vertical axis 771). FIG. 24 is a top view of another embodiment of the plate 752, with the plate including a cross-shaped section 710. The cross-shaped section 710 may be integrally formed with or otherwise coupled to the sidewalls 761, posts 765, or other components. For instance, four legs 712 of the cross-shaped section 710 may be coupled to a base 763 of the plate 752. In at least some embodiments, the cross-shaped section 710 is integral with or otherwise coupled to the base 763 or other portion of the plate 752 in a position that also allows a circuit board (e.g. circuit board 730) to also be coupled to the plate 752.

The cross-shaped section 710 may be used in a manner similar to that of the cross plate 610 of FIG. 20 to couple a strain gauge 750J to a chassis, drill collar, BHA, circuit board, or other component. In some embodiments, the cross-shaped section 710 concentrates torsional deformations to more readily transmit torsional strain. Thus, the four legs 712 may extend away from a center section that includes the strain gauge 750J. The legs 712 may also include an opening to allow the cross-shaped section 710 to be coupled to a circuit board, drill collar, chassis, or the like;

however, the plate 752 may also be removably fastened to such components in other manners. For instance, as shown in FIGS. 21 and 24, openings 716 may be positioned in the posts 765 rather than in the legs 712. The openings 716 may be located to optionally allow a retrofit into an existing tool, or may be located for a customized tool. The specific type of fastener may be varied, but may provide a firm and fully elastic coupling that has little to no slipping or plastic deformation. With such a connection, the strain gauge 750J may be deformed in response to torque applied to the drill collar. The strain gauge 750J may itself may then have a pattern and attachment chosen to be sensitive to such deformation (e.g., a V-pattern may be used for torque), and calibration can be used to relate the strain measured on the cross-shaped section 710 with the torque applied to the collar.

The plate 752 is illustrative only, and may be varied in any number of manners, and may also be made of any suitable material. For instance, the plate 752 may be formed of a metal, metal alloy, composite, organic, or polymer material, or combinations thereof. The plate 752 may also be formed in any suitable manner. For instance, the plate 752 may be machined, cast/molded, additively manufactured, or produced in any other suitable manner. The shape may also be varied as desired, such as by modifying the shape of the cross-shaped section, the sidewalls, the posts, and the like. The dimensions may be varied as well to provide greater or lesser separation between strain gauges in the same bridge, and strain gauges may be used to measure any suitable strain, and are not limited to in-plane bending, out-of-plane bending, axial strain, or torsional strain.

Figure 25:
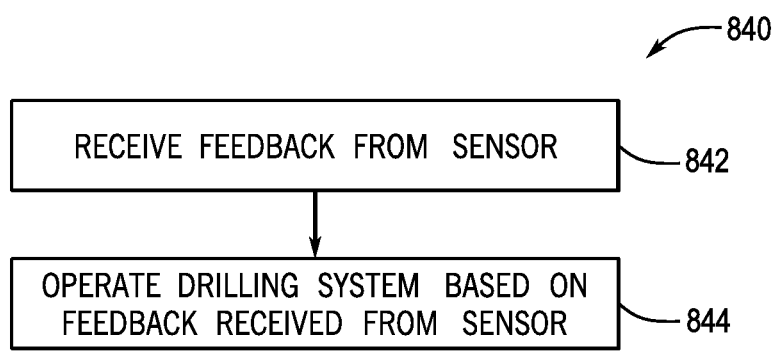
FIG. 25 is a flow chart illustrating a method or process for operating a drilling system based on determined deformations, according to an embodiment of the disclosure.

FIG. 25 is a flowchart of an embodiment of a method or process 840 for operating a drilling system or components thereof (e.g., drilling system 10, the drill string 16, or the BHA 18) based on determined deformations. The method 840 may be performed by a controller, such as the data processing system 160, and may be performed for any of the embodiments of the BHA 18 described herein. At block 842, the data processing system 160 receives feedback or another signal from a sensor (e.g., sensor 167), which may include any of the strain gauges or alternative sensors discussed herein, or any other suitable sensor. Such feedback is indicative of a deformation of the BHA 18, including out-of-plane bending, in-plane bending, torsion, or axial strain of the component (e.g., chassis 204, the drill collar 200, the electronics board 430, etc.).

At block 844, the data processing system 160 operates the drilling system 10 based on the feedback received from the sensor 167. For example, the feedback (e.g., an out-of-plane bending strain is above a threshold strain) may indicate that the BHA 18 is likely directing the drill bit 20 in a path that is off the desired well path and is instead drilling the wellbore 12 toward a projected location that is away from a target location. As a result, a particular operation of the drilling system 10, such as rotational speed or WOB of the drill bit 20, may be adjusted to change the bending and drive the BHA 18 toward the target location (e.g., upon determining that the projected location is different than the target location by a threshold distance). In another example, the feedback may indicate that an undesirable force is imparted onto the BHA 18 and may affect a performance of the BHA 18 (e.g., the quality of the wellbore 12) or the structural integrity or other health of the BHA 18. Therefore, the operation of the drilling system 10 may be adjusted to reduce or limit the effects of the undesirable force.

With reference to the embodiments described herein, and in an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Further, lists of alternative features or aspects joined by "or" are intended to indicate that one or more of such features or aspects can be included, and not that such features are purely alternatives.

While embodiments of the present disclosure have been discussed primarily with reference to downhole drilling operations for extracting hydrocarbons, embodiments of the present disclosure are not related to any particular environment, industry, or application. For instance, drilling technologies to form wellbores to set utility lines are also applicable for embodiments of the present disclosure. Further, any industry or application in which measurements of strain may affect performance of operation of equipment may utilize aspects of the present disclosure, including in automotive, aerospace, construction, manufacturing, mining, and alternative energy industries and applications.

The specific embodiments described herein have been shown by way of example, and it should be noted that these embodiments may be susceptible to various modifications and alternative forms. It should be further noted that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted as functional claim elements. However, for any claims containing elements designated in any other manner, it is intended that such elements are not to be interpreted as functional claim elements.

What is claimed is:

1. A bottom hole assembly (BHA) of a drill string, the BHA comprising:
   a collar;
   a plate coupled to the collar; and
   a strain gauge coupled to the plate and configured to output a signal associated with a deformation of the plate, the strain gauge being isolated from at least three of torsion, out-of-plane, in plane, or axial deformations.

2. The BHA of claim 1, further comprising:
   a chassis coupled to the collar, wherein the collar is positioned around the chassis, the plate, and the strain gauge.

3. The BHA of claim 1, the BHA further comprising an electronics board coupled to or part of the plate and configured to receive the signal output by the strain gauge and to do one or more of operate the BHA based on the signal or store deformation information based on the signal.

4. The BHA of claim 1, the plate including electronics board:
   communicatively coupled to the strain gauge;
   configured to receive the signal output by the strain gauge; and
   operate the BHA based on the signal, store deformation information based on the signal, or both.

5. The BHA of claim 1, the strain gauge including a torsion strain gauge, an in-plane bending strain gauge, an out-of-plane bending strain gauge, an axial strain gauge, or any combination thereof.

6. The BHA of claim 5, the strain gauge including:
   the torsion strain gauge on a first surface of the plate, such that readings by the torsion strain gauge correspond with torsional deformations of the collar and are isolated from in-plane, out-of-plane, and axial deformations.

7. The BHA of claim 5, the strain gauge including:
   a first in-plane bending strain gauge on a first surface of the plate at a first side of a centerline of the plate; and
   a second in-plane bending strain gauge on the first surface at a second side of the centerline of the plate and substantially aligned with the first in-plane bending strain gauge along a lateral axis of the plate, such that readings by the first and second in-plane bending strain gauges correspond with in-plane bending deformations of the collar and are isolated from torsion, out-of-plane, and axial deformations.

8. The BHA of claim 5, the strain gauge including:
   a first out-of-plane bending strain gauge on a first surface of the plate along a centerline of the plate; and
   a second out-of-plane bending strain gauge on a second surface of the plate along the centerline and substantially aligned with the first out-of-plane bending strain gauge along a vertical axis of the plate, such that readings by the first and second out-of-plane bending strain gauge correspond with out-of-plane bending deformations of the collar and are isolated from torsion, in-plane, and axial deformations.

9. The BHA of claim 5, the strain gauge including:
   a first axial strain gauge on a first surface of the plate along a centerline of the plate; and
   a second axial strain gauge on a second surface of the plate along the centerline and aligned with the first axial strain gauge along a vertical axis of the plate, such that readings by the first and second axial strain gauges correspond with axial deformations of the collar and are isolated from torsion, out-of-plane, and in-plane deformations.

10. The BHA of claim 1, the plate having a cross shape or including a portion having a cross shape, with the strain gauge positioned at a center section of the cross shape.

11. A bottom hole assembly (BHA) of a drill string, comprising:
    a chassis;
    an electronics board coupled to the chassis and configured to operate the BHA; and a strain gauge coupled to the electronics board and configured to transmit a signal indicative of a deformation to the electronics board to control operation of the BHA based at least partially on the signal indicative of the deformation to the electronics board, the strain gauge being isolated from at least three of torsion, out-of-plane, in plane, or axial deformations.

12. The BHA of claim 11, the electronics board being configured to calibrate the deformation indicated by the signal to generate an additional deformation associated with the chassis.

13. The BHA of claim 12, the additional deformation representing torsion on the chassis.

14. The BHA of claim 11, the electronics board being configured to:
   determine a projected location of the BHA based on the signal;
   compare the projected location with a target location; and
   operate the BHA to direct the BHA toward the target location.

15. The BHA of claim 11, the electronics board being configured to operate the BHA to reduce the deformation indicated by the signal, store deformation information based on the signal, or both.

16. The BHA of claim 11, the deformation including a torsional strain, an out-of-plane bending strain, an in-plane bending strain, an axial strain, or any combination thereof.

17. The BHA of claim 11, further comprising:
   a drill collar; and
   an internal component that includes the chassis and is at least partially within the drill collar, the internal component being coupled to the electronics board such that the electronics board is within the drill collar, and wherein the signal indicative of the deformation to the electronics board corresponds to torque on the drill collar.

18. The BHA of claim 11, further comprising a plate coupled to the strain gauge and removably coupled the electronics board, the plate having a cross shape or including a cross shape portion.

19. A plate for use in a downhole tool within a bottom hole assembly (BHA), the plate comprising:
   a first surface;
   a second surface parallel to the first surface;
   a torsion strain gauge coupled to the first surface or the second surface;
   two in-plane bending strain gauges each coupled to the first surface or each coupled to the second surface, the two in-plane bending strain gauges being on opposite sides of a centerline of the plate and aligned along a lateral axis of the plate;
   a first out-of-plane bending strain gauge coupled to the first surface of the plate along the centerline of the plate;
   a second out-of-plane bending strain gauge coupled to the second surface of the plate along the centerline and aligned with the first out-of-plane bending strain gauge along a vertical axis of the plate;
   a first axial strain gauge coupled to the first surface of the plate along the centerline of the plate; and
   a second axial strain gauge coupled to the second surface of the plate along the centerline and aligned with the first axial strain gauge along the vertical axis.

20. The plate of claim 19, the plate including an electronics board configured to receive respective signals from, and operate the BHA based on, respective signals received from the torsion strain gauge, the two in-plane bending strain gauges, the first out-of-plane bending strain gauge, the second out-of-plane bending strain gauge, the first axial strain gauge, the second axial strain gauge, or any combination thereof.

* * * * *